US011110351B2

(12) United States Patent
Anabuki et al.

(10) Patent No.: US 11,110,351 B2
(45) Date of Patent: Sep. 7, 2021

(54) INFORMATION STORAGE MEDIA, GAME DEVICES AND SERVERS

(71) Applicant: BANDAI NAMCO ENTERTAINMENT INC., Tokyo (JP)

(72) Inventors: Kenji Anabuki, Nishitokyo (JP); Asana Inoki, Tokyo (JP); Shoji Aomatsu, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/562,784

(22) Filed: Sep. 6, 2019

(65) Prior Publication Data

US 2020/0078683 A1    Mar. 12, 2020

(30) Foreign Application Priority Data

Sep. 6, 2018  (JP) .............................. JP2018-166932
Jul. 17, 2019  (JP) .............................. JP2019-131913

(51) Int. Cl.
| A63F 13/57 | (2014.01) |
| A63F 13/23 | (2014.01) |
| G06T 13/20 | (2011.01) |
| A63F 13/537 | (2014.01) |
| A63F 13/5252 | (2014.01) |

(52) U.S. Cl.
CPC .............. *A63F 13/57* (2014.09); *A63F 13/23* (2014.09); *G06T 13/20* (2013.01); *A63F 13/5252* (2014.09); *A63F 13/537* (2014.09); *A63F 2300/1025* (2013.01); *A63F 2300/64* (2013.01); *A63F 2300/6607* (2013.01)

(58) Field of Classification Search
CPC ................................. A63F 13/57; A63F 13/23
See application file for complete search history.

(56) References Cited

U.S. PATENT DOCUMENTS

| 2012/0004031 A1* | 1/2012 | Barney ................... A63F 13/06 463/31 |
| 2012/0094759 A1* | 4/2012 | Barney ................. A63F 13/235 463/31 |

(Continued)

FOREIGN PATENT DOCUMENTS

JP    3843241 B2    11/2006

OTHER PUBLICATIONS

"A question about Super Mario Bros 2 and its remakes," 2015 available at https://www.reddit.com/r/gaming/comments/3g6nop/a_question_about_super_mario_bros_2_and_its/ (Year: 2015).*

(Continued)

*Primary Examiner* — Jay Trent Liddle
(74) *Attorney, Agent, or Firm* — Oliff PLC

(57) ABSTRACT

Provided is the game device which sets the designated object from among the objects arranged in the game space as an object in the holding state, performs control for arranging the object set in the holding state at the predetermined position in the game space, and/or displays information of the object set in the holding state at a predetermined position on the game image. When the predetermined condition is satisfied, the game device releases the holding state of the object set to be in the holding state by the holding controller and causes the object to perform the predetermined operation.

20 Claims, 24 Drawing Sheets

(56) References Cited

U.S. PATENT DOCUMENTS

| | | | | |
|---|---|---|---|---|
| 2012/0270657 A1* | 10/2012 | Barney | ............... | A63H 30/04 463/37 |
| 2013/0196727 A1* | 8/2013 | Barney | ............... | A63F 13/06 463/7 |
| 2016/0232715 A1* | 8/2016 | Lee | ............... | A63F 13/211 |

OTHER PUBLICATIONS

Cornshaq, "Super Mario Advance—Play It Through," 2017 available at https://www.youtube.com/watch?v=dPVplopYb4c (Year: 2017).*

RymeWith US, "How to level up fast in Skyrim using Telekinesis," 2015 available at https://www.youtube.com/watch?v=RVG7amDgW58 (Year: 2015).*

WiiLikeToPlay, New Super Mario Bros. Wii—Part 1 (4 Player, 2018), May 25, 2018, available at https://www.youtube.com/watch?v=yyZB60Y2dFo (Year: 2018).*

Super Mario USA, https://www.nintendo.co.jp/ngc/sms/history/smu.

* cited by examiner

| OBJECT ID | OBJECT NAME | TYPE | HOLDING ALLOWABLE FLAG | HOLDING STATE FLAG | WEIGHT | ATTRIBUTION | CONSUMP-TION VALUE |
|---|---|---|---|---|---|---|---|
| 001 | OB1 | BICYCLE | 1 | 1 | 13 | WATER | 60 |
| 002 | OB2 | BENCH | 1 | 1 | 11 | WATER | 50 |
| 003 | OB3 | DRUG | 1 | 1 | 0.1 | FIRE | 30 |
| 004 | OB4 | AUTOMOBILE | 1 | 0 | 1600 | FIRE | 200 |
| 005 | OB5 | DRONE | 1 | 0 | 30 | TREE | 100 |
| 006 | OB6 | GUN | 0 | 0 | 3 | FIRE | 300 |
| 007 | OB7 | VENDING MACHINE | 1 | 0 | 400 | LIGHT | 250 |
| 008 | OB8 | REFRIGERATOR | 1 | 0 | 300 | WATER | 250 |
| 009 | OB9 | SHIELD | 1 | 0 | 900 | FIRE | 500 |
| 010 | OB10 | ENEMY CHARACTER | 0 | 0 | 1900 | DARK | 600 |
| 011 | OB11 | NAIL | 1 | 0 | 0.1 | FIRE | 10 |
| ... | ... | ... | ... | ... | ... | ... | ... |

FIG. 9

| CAPABILITY VALUE | TYPE |
|---|---|
| 1~10 | NAIL |
| 11~20 | NAIL, BICYCLE |
| 21~30 | NAIL, BICYCLE, BENCH |
| 31~40 | NAIL, BICYCLE, BENCH, DRUG |
| ... | ... |

FIG. 11

INFORMATION STORAGE MEDIA, GAME DEVICES AND SERVERS

Japanese Patent Application 2018-166932, filed Sep. 6, 2018, and Japanese Patent Application 2019-131913, filed Jul. 17, 2019, are hereby incorporated by reference in its entirety.

BACKGROUND OF THE INVENTION

The present invention relates to an information storage medium, a game device, and a server.

Traditionally, there has been known a game that is performed by using an object in contact with a player character.

For example, there is a game in which characters roll the spherical object and combine objects that collide with the spherical object such that the spherical object is enlarged in a snowballing manner (e.g., Japanese. Pat. No. 3843241).

In addition, there is a game in which a player character grabs an object existing in a game space and throws the object onto the enemy character to attack it (for example, Super Mario USA [Jun. 14, 2018 search] (https://www.nintendo.co.jp/ngc/sms/history/smu/).

However, the system described in U.S. Pat. No. 3,843,241 and the system described in the Super Mario USA [Jun. 14, 2018 search] (https://www.nintendo.co.jp/ngc/sms/history/smu) are simple games in which the player character contacts the object and operates the object as it is (rolling, throwing or the like). Accordingly, there is room for further improvement in these systems.

SUMMARY

The invention can provide an information storage medium, a game device, and a server capable of expanding the operation of the object and increasing its attractiveness by realizing a game in which the player character operates the object without touching the object.

There is provided an information storage medium according to the first aspect of the present invention, the information storage medium being a computer-readable non-temporary information storage medium that stores a program for executing a game system in which a player character plays against an opponent character using an object disposed in a game space, the program causing the game system to function as:

a selector that sets a designated object as an object in the selected state from among the objects arranged in the game space, a period controller that controls the waiting time period from specific timing to the execution of a predetermined operation with respect to the object in the selected state;

an operation controller that performs a predetermined operation with respect to the object in the selected state at timing when the waiting time period has elapsed from the specific timing; and the period controller that controls the waiting time period based on at least one of the weight of the object in the selected state and the type of the object in the selected state.

There is provided a game device according to the second aspect of the present invention, the game device in which a player character plays against an opponent character using an object disposed in a game space, the game device including:

a selector that sets a designated object as an object in the selected state from among the objects arranged in the game space;

a period controller that controls the waiting time period from specific timing to the execution of a predetermined operation with respect to the object in the selected state;

an operation controller that performs a predetermined operation with respect to the object in the selected state at timing when the waiting time period has elapsed from the specific timing; and the period controller that controls the waiting time period based on at least one of the weight of the object in the selected state and the type of the object in the selected state.

There is provided a server according to the third aspect of the present invention, the server in which a player character plays against an opponent character using an object disposed in a game space, the server including:

a selector that sets a designated object as an object in the selected state from among the objects arranged in the game space;

a period controller that controls the waiting time period from specific timing to the execution of a predetermined operation with respect to the object in the selected state;

a operation controller that performs a predetermined operation with respect to the object in the selected state at timing when the waiting time period has elapsed from the specific timing; and the period controller that controls the waiting time period based on at least one of the weight of the object in the selected state and the type of the object in the selected state.

BRIEF DESCRIPTION OF THE SEVERAL VIEWS OF THE DRAWING

FIG. 9 is a diagram illustrating an example of information regarding an object of the first embodiment.

FIG. 11 is a diagram illustrating an example of a relationship between a capability value and a type of the first embodiment.

Figure 1:
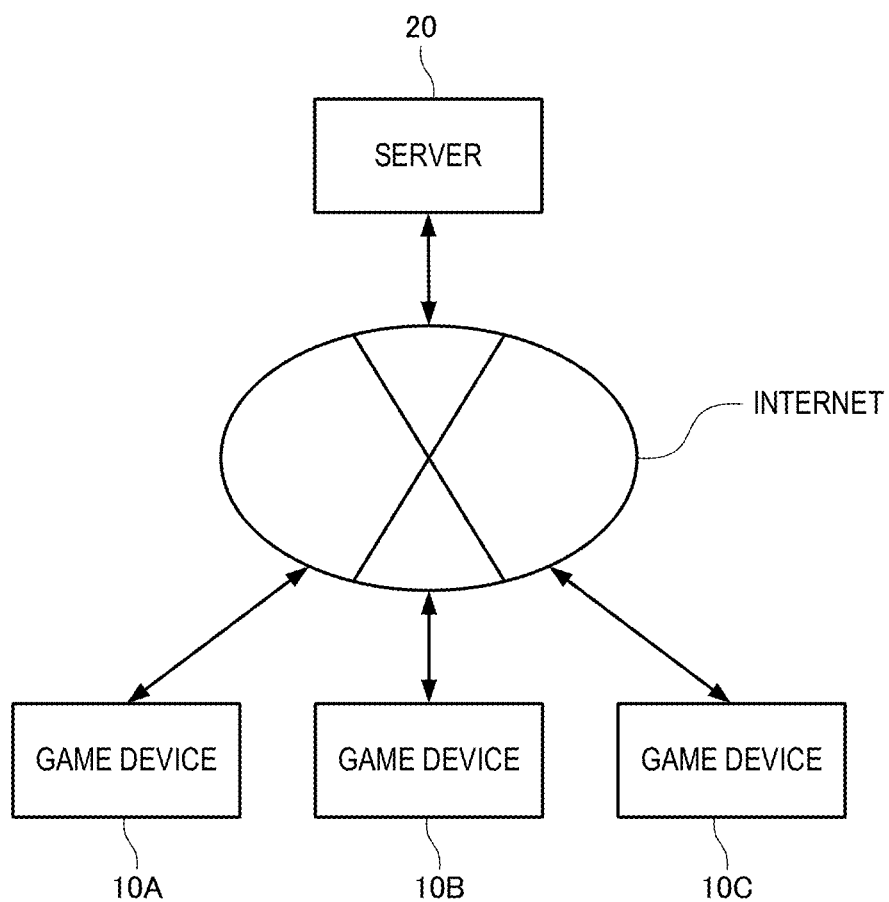
FIG. 1 is a diagram illustrating an example of a network diagram of the game system of the first embodiment.

DETAILED DESCRIPTION OF THE EMBODIMENTS (1) One embodiment of the invention relates to an information storage medium that stores a program for executing a game system in which a player character plays against an opponent character using an object disposed in a game space, the program causing the game system to function as:

a selector that sets a designated object as an object in the selected state from among the objects arranged in the game space, a period controller that controls the waiting time period from specific timing to the execution of a predetermined operation with respect to the object in the selected state; and an operation controller that performs a predetermined operation with respect to the object in the selected state at timing when the waiting time period has elapsed from the specific timing, wherein the period controller controls the waiting time period based on at least one of the weight of the object in the selected state and the type of the object in the selected state.

Also, one embodiment of the present invention relates to a game apparatus having the above-described configuration. One embodiment of the present invention relates to a server having the above-described configuration.

According to the embodiment described above, the player character can set the object to the selected state without touching the object and then operate the object. Namely, since the above-described embodiment can expand the operation of the object, a game can be provided to the player that the player is more interested in.

For example, according to the above-described embodiment, the player character can set the object to be in the selected state without touching the object and cause a predetermined operation (e.g., an attack toward the enemy character) of the object in the selected state to be performed at the timing when the waiting time period, which starts from the specific timing, expires.

In addition, according to the above-described embodiment, since the waiting time period is controlled based on at least one of the weight of the object in the selected state and the type of object in the selected state, the above-described embodiment can reproduce the difficulty of operation of the object in the selected state as a game depending on the weight and the type of object in the selected state.

(2) In the above-described information storage medium, game device, and server, the specific timing is start timing of predetermined input, and the operation controller may perform the predetermined operation with respect to the object in the selected state at the timing when an elapsed time in which the predetermined input is continuously detected from the specific timing exceeds the waiting time period.

According to the above-described information storage medium, game device, and server, a predetermined operation is performed with respect to the object in the selected state at the timing when an elapsed time in which the predetermined input (e.g., touch input, button input, etc.) is continuously detected from the specific timing exceeds the waiting time period.

Therefore, the player can make an intuitive input.

In addition, the waiting time period may be referred to as a hold period, the waiting time period, which starts from the timing being the start timing of the predetermined input, expires while the predetermined input is being entered.

(3) In the above-described information storage medium, game device, and server, the period controller may increase the waiting time period longer as the weight of the object in the selected state increases.

According to the above-described information storage medium, game device, and server, the waiting time period can be increased longer as the weight of the object in the selected state increases, and then, the game can be reproduced such that the heavier an object requires the longer period to operate.

(4) In the above-described information storage medium, game device, and server, the selector may set the designated object based on the operation input of the player from among the objects existing in the game space, as an object in the selected state.

According to the above-described information storage medium, game device, and server, since the player can designate an object in the selected state by the player's own input operation, the player can set an object in the selected state based on the player's own intention.

(5) In the above-described information storage medium, the program further may cause the game system to function as a range setting processor that sets a predetermined range in the game space based on the position of the player character in the game space, the selector may set the designated object from among the objects that exist within the predetermined range, as an object in the selected state.

In the above-described game device and server, the game device and server further include a range setting processor that sets a predetermined range in the game space based on the position of the player character in the game space, the selector may set the designated object from among the objects that exist within the predetermined range, as an object in the selected state.

According to the above-described information storage medium, game device, and server, the predetermined range affecting the setting of the selected state is set based on the position of the player character. Therefore, the player can play the game with recognition of the position of the player character.

(6) In the above-described information storage medium, game device, and server, the range setting processor may change a size of the predetermined range based on the position of the player character.

According to the above-described information storage medium, game device, and server, the position of the player character affects the size of a predetermined range. Therefore, the player can play the game with recognition of the position of the player character.

(7) In the above-described information storage medium, game device, and server, the range setting processor may change the size of the predetermined range based on a predetermined parameter of the player character.

According to the above-described information storage medium, game device, and server, a predetermined parameter of the player character affects a predetermined range size.

Therefore, the player can be motivated to improve a predetermined parameter of the player character, thereby increasing the amusement of the game.

(8) In the above-described information storage medium, game device, and server, the selector may set a plurality of objects to the selected state.

According to the above-described information storage medium, game device, and server, since a plurality of objects can be set to a selected state, the player can play the game strategically.

(9) In the above-described information storage medium, game device, and server, the selector may control display of the number of objects in the selected state.

According to the above-described information storage medium, game device, and server, the player can easily figure out the number of objects in the selected state.

(10) In the above-described information storage medium, game device, and server, the period controller may set the waiting time period of each of the plurality of objects in the selected state based on at least one of the weight of the object in the selected state and the type of the object in the selected state, and the operation controller may perform the predetermined operation with respect to each of the plurality of the object in the selected state at timing when the predetermined input is detected after the waiting time period, which starts from the specific timing, expires.

According to the above-described information storage medium, game device, and server, since a plurality of objects can be operated, the player can play the game with a strategic plan. Also, according to the above-described information storage medium, game device, and server, the waiting time period is set for each object in the plurality of selected states based on at least one of the weight of the object in the selected state and the type of object in the selected state. Therefore, the waiting time period can be set for each object in the selected state. According to the above-described information storage medium, game device, and server, for example, the enemy character can be attacked first by a light object and the enemy character can be attacked by a last heavy object, finally. Further, according to the above-described information storage medium, game device, and server, the enemy character can be attacked first by a particular type of object, and the enemy character can be attacked by another object, finally.

(11) In the above-described information storage medium, game device, and server, the selector may determine whether or not to set the object in the selected state according to at least one of a distance between the player character and the object in the game space, a type of the object, an attribution of the object, and a compatibility between the player character and the object in the game.

According to the above-described information storage medium, game device, and server, the player plays the game in consideration of at least one of the distance between the player character and the object, the type of the object, the attribution of the object, and the compatibility between the player character and the object, thereby improving the amusement of the game.

(12) In the above-described information storage medium, game device, and server, the selector may change at least one of a number, an attribution, and a type of objects that can be set in the selected state according to a predetermined parameter of the player character.

According to the above-described information storage medium, game device, and server, for example, the higher the predetermined parameters of the player character, the more control is possible, such as increasing the number of objects that can be set in the selected state. Therefore, the motivation to improve the predetermined parameters of the player character can be provided, and the interesting of the game play can be further improved.

(13) In the above-described information storage medium, game device, and server, the operation controller may change the operation of the object according to a predetermined parameter of the player character.

According to the above-described information storage medium, game device, and server, for example, the higher the predetermined parameters of the player character, the more control is possible such as increasing the offensive power of the object's attack operation. Therefore, the motivation to improve the predetermined parameters of the player character can be provided, and the interesting of the game play can be further improved.

(14) In the above-described information storage medium, game device, and server, the operation controller may perform the predetermined operation with respect to the object in the selected state on condition that a given consumption value is subtracted from an operating parameter.

According to the above-described information storage medium, game device, and server, a given consumption value is subtracted from the operating parameter in exchange for the operation of the object. Accordingly, the above-described information storage medium, game device, and server can prevent the object from being operated carelessly, and the player can play the game strategically in view of the operating parameters. The above-described information storage medium, game device, and server provide motivation to the player to improve the operating parameters, and the interesting of the game play can be further improved.

(15) In the above-described information storage medium, game device, and server, the period controller may set the waiting time period with respect to the object in the selected state based on at least one of the weight of the object and the type of object in the selected state, and a predetermined parameter of the player character.

According to the above-described information storage medium, game device, and server, for example, the waiting time period can be shortened by increasing a predetermined parameter of the player character for the object in the selected state. Accordingly, the above-described information storage medium, game device, and server provide an incentive to improve a predetermined parameter of the player character, and the interesting of the game play can be further improved.

Hereinafter, embodiments will be described below. Note that the following embodiments do not unduly limit the scope of the invention as stated in the claims. In addition, all of the elements described in connection with the following embodiments should not necessarily be taken as essential requirements of the invention.

1. First Embodiment

FIG. 1 is a diagram illustrating an example of a system configuration of game system 1 according to a first embodiment of the present invention. As shown in FIG. 1, the game system 1 includes server 20 for providing game service and game device 10 (for example, the game devices 10A, 10B, and 10C). The server 20 and the game device 10 are connected to the Internet (an example of a network).

The server 20 is an information processing device, a computer, or the like that provides the service to the game device 10. The server 20 may function, for example, as an SNS server that provides a service that can provide communication between a plurality of players.

The game device 10 executes a game program of the first embodiment stored in the storage 170 (or the information storage medium 180).

A game program includes a game application. The game device 10 may receive the game program from the server 20 and store the program in the storage 170 (or the information storage medium 180) by pre-accessing the server 20.

The server 20 may also be connected via a network to the game device 10 of a plurality of players to provide a service of an online game that can share the same game progress simultaneously online.

The server 20 may also be comprised of one device or processor or a plurality of devices or processors.

Information such as the accounting information and the game information stored in the storage area of the server 20 may be stored in a database (in a broad sense, a storage device and a memory) connected via a network (an intranet or the Internet). When the server 20 functions as an SNS server, the information stored in the storage may be stored in a database (in a broad sense, storage device, or memory) connected to the network (Intranet or Internet).

The game device 10 is a device that can be connected to the server 20 via a network such as an Internet (WAN) or a LAN. The communication line between the game device 10 and the server 20 may be wired or wireless.

1.1 Game Device Configuration

Figure 2:
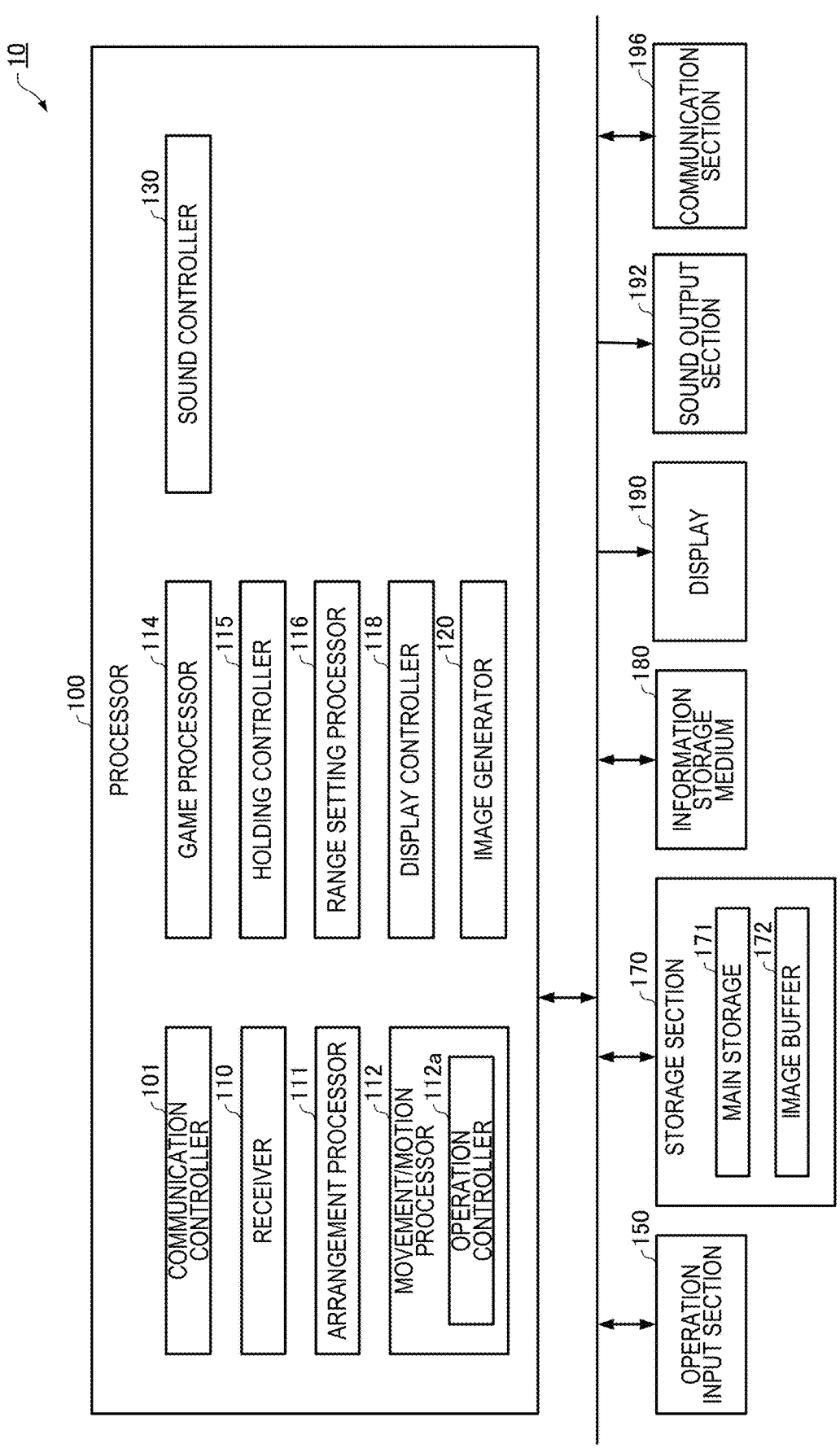
FIG. 2 is a diagram illustrating an example of a functional block diagram of the game device of the first embodiment.

A configuration of the game device 10 will be described with reference to FIG. 2. FIG. 2 is an example of a functional block diagram of the game device 10. In addition, the game device 10 need not include all of the elements of FIG. 2, and may have a configuration in which one or more elements thereof are omitted.

The game device 10 is an information processing device (computer, or terminal device) such as a portable game device, a portable terminal device, a smartphone, a tablet, a cellular phone, or an image generating device.

The game device 10 includes operation input unit 150, storage 170, information storage medium 180, processor 100, display 190, sound output unit 192, and communication unit 196.

The operation input section 150 has a plurality of buttons, an analog stick, an acceleration sensor as a physical sensor for detecting information that varies in response to a tilt or a movement, a microphone, a vibration section for providing feedback of a perceptual vibration to the player in accordance with the contents of the game, a control circuit for controlling various kinds of control including vibration control of the transducer, and a communication section. The operation input section 150 includes an operator such as a touch panel display.

The operation input 150 may further include a lever, an arrow key, and a mouse. The operation input section 150 may also include a gyro sensor for detecting an angular velocity applied to the controller itself.

The operation input unit 150 is an operation input device of which the position and orientation can be arbitrarily changed while the operation input unit 150 is held in both hands of the player P. The operation input unit 150 is detachable from the main body of the game device 10. The game device 10 may has the main body which is structurally integrated with the operation input unit 150. The operation input unit 150 may receive the voice input.

When the operation input section 150 is not mounted to the main body of the game device 10, the operation input section 150 controls to transmit and receive data from the main body through radio communication. When the operation input section 150 is mounted on the main body of the game device 10, the operation input section 150 may be connected to the game device 10 by a connector (not shown), and each operation input section 150 may have a connection for charging or other connection for providing electrical connection or data communication.

The storage 170 is a work area of the processor 100, the communication unit 196, and the like. The function of the storage 170 is implemented by hardware such as RAM (VRAM).

In particular, the storage 170 includes main storage 171 and an image buffer 172. An image generated in the image generator 120 is stored in the image buffer 172.

The information storage medium 180 (a computer-readable medium) stores programs, data, and the like. The functions of the information storage medium 180 are implemented by hardware such as an optical disk (CD or DVD), magnetic disk (MO), magnetic disc, hard disc, magnetic tape, or memory (ROM).

The processor 100 performs various processes of the first embodiment on the basis of data read from the program stored in the storage 170 or the information storage medium 180. Specifically, a program (a program for causing a computer to perform the processing of each part) for having a computer function as the respective parts of the first embodiment is stored in the storage 170 or the information storage medium 180.

The program for causing the computer to function as the respective parts of the first embodiment may be distributed from the storage 240 provided by the server 20 and the information storage medium 280 to the information storage medium 180 (or the storage 170) via the network. The use of a storage 240 of such a server 20 and an information storage medium 280 is also within the scope of the present invention.

The processor 100 (processor) performs game processing, image generation processing, or sound control processing based on information (input information) input from the operation input unit 150, programs developed from the information storage medium 180 to the storage 170, or the like.

The processor 100 performs various game processing. For example, the processor 100 performs processing for starting the game when the game start condition is satisfied, processing for proceeding with the game, processing for ending the game when the game end condition is satisfied, and processing for ending when the final stage is cleared.

The processor 100 functions as communication controller 101, receiver 110, arrangement processor 111, movement/motion processor 112, game processor 114, holding controller 115, range setting processor 116, display controller 118, image generator 120, and sound controller 130.

The communication controller 101 performs processing for transmitting and receiving data through the network with the other game device 10 or the server 20.

The receiver 110 performs processing for receiving an instruction (for example, an operation instruction) from the operation input unit 150 and input information (for example, an operation input and an input signal) from the operation input unit 150. For example, the receiver 110 receives any one of a plurality of types of operation instructions as an instruction of an object.

The arrangement processor 111 performs processing for arranging an object in a game space (also referred to as a virtual space, a virtual three-dimensional space, or an object space). For example, the arrangement processor 111 performs processing for arranging a character, an object, a display object such as a building, a baseball park, a car, a tree, a pillar, a wall, or a map (landform) in a game space. Here, a game space is a virtual game space. For example, in the case of a virtual three-dimensional space, an object is arranged in a three-dimensional coordinate system (X, Y, Z), such as a world coordinate system or a virtual camera coordinate system.

For example, the arrangement processor 111 arranges an object (an object composed of primitives such as a polygon, a free-form surface, or a sub-division surface) in the world coordinate system. For example, the arrangement processor 111 determines a position and a rotation angle (synonym of orientation and direction) of the object in the world coordinate system and arranges the object at the rotation angle (rotation angle around the X, Y, and Z axes) in the position (X, Y, and Z). The arrangement processor 111 may perform a process of arranging a scaled object in a virtual space.

The arrangement processor 111 may dispose an object in a virtual two-dimensional space.

The movement/motion processor 112 performs calculation of movement and operation of an object in a game space (virtual space). Specifically, the movement/motion processor 112 perform processing for moving the object in a virtual space and operating the object (motion or animation) based on input information, a program (movement/motion algorithm), or various data (motion data). Specifically, the movement/motion processor 112 performs processing for sequentially calculating movement information (movement speed, movement acceleration, position, and direction) and operation information (position or rotation angle of each part constituting the object) of the object every one frame (1/60 second). The frame is the unit of time in which the object movement and operation processing and the image generation processing are performed.

When an object is moved in a virtual two-dimensional space, the movement/motion processor 112 may perform control for moving the object in a given direction of movement at a predetermined speed.

The movement/motion processor 112 includes operation controller (motion controller) 112a. The operation controller 112a performs a predetermined operation for the object by releasing the holding state of the object set to be in the holding state by the holding controller 115. Details are given below.

The game-processor 114 mainly performs various game processing described above and performs various game calculation related to the game.

The holding controller 115 sets a designated object from among the objects arranged in the game space, as an object in the holding state. The holding controller 115 performs a control for arranging the object in the holding state at a predetermined position in the game space, a control for displaying information regarding the object in the holding state at a predetermined position on the game image, or both. Details are given below.

In addition, when performing control for arranging the object in the holding state at a predetermined position in the game space, the holding controller 115 performs processing for arranging the object in the holding state in the game space using the same method as the arrangement unit 111.

Specifically, the holding controller 115 arranges objects (objects consisting of primitives such as polygons, free-form surfaces, or sub-division surface) in the holding state at three-dimensional coordinates (X, Y, and Z), such as the world coordinate system and the virtual camera coordinate system. For example, the holding controller 115 determines the position and rotation angle (synonym of orientation and direction) of the object in the holding state in the world coordinate system and arranges the holding state object at the position (X, Y, and Z) with the rotation angle (rotation angle around the X, Y, and Z axes). In addition, the holding controller 115 may perform processing for arranging the scaled object in the virtual space.

Further, when performing control for displaying information regarding the object in the holding state at a predetermined position on the game image, the holding controller 115 performs control for displaying information regarding the object in the holding state in a predetermined display area of the display 190 (for example, a predetermined area WA on the right side of the display 190).

The range setting processor 116 sets a predetermined range in the game space. Details are given below.

The display controller 118 performs control for displaying an image generated by the image generator 120 and information related to the image on the display 190.

The image generator 120 performs a drawing process based on the results of various processes performed by the processor 100 and generates an image by the drawing process.

The image generator 120 receives object data (model data) including vertex data (position coordinates of the vertices, texture coordinates, color data, normal vector, or a value) of each vertices of the object (model). The image generator 120 performs vertex processing (shading by the vertex shader) based on the vertex data included in the input object data. When performing the vertices processing, the image generator 120 may perform the vertices generating processing (tessellation, curved surface splitting, and polygon splitting) for subdividing the polygon as necessary.

In vertex processing, the image generator 120 performs geometry processing such as vertices movement processing, coordinate transformation (for example, world coordinate transformation), field of view transformation (camera coordinate transformation), clipping processing, fluoroscopy transformation (projection transformation), and viewport transformation in accordance with the vertex processing program (vertex shader program or the first shader program).

The image generator 120 modifies (updates and adjusts) the vertex data given to the vertices of the object based on the result of these processes.

The image generator 120 performs rasterization (scan conversion) based on the vertex data after the vertices processing and associates the plane of the polygon (primitive) with the pixel.

The image generator 120 performs the pixel processing (shading by pixel shaders and fragment processing) for drawing the pixels (fragments constituting the display screen image) constituting the image after the rasterization. In pixel processing, the image generator 120 determines the final drawing color of the pixel constituting the image, by performing various processes such as reading the texture (texture mapping), setting/changing the color data, translucent compositing, and anti-aliasing in accordance with the pixel processing program (pixel shader program or the second shader program). The image generator 120 outputs (draws) the drawing color of the object converted into a fluoroscopy to the image buffer 172 (a buffer capable of storing image information in pixels. VRAM or rendering target). Specifically, in the pixel processing, the image generator 120 performs the per-pixel processing for setting or changing image information (color, normal line, brightness, and a value) in pixel units. Accordingly, the image generator 120 generates an image visible from a virtual camera (a given viewpoint) in the object space. When a plurality of virtual cameras (viewpoints) exists in the object space, the image generator 120 generates an image so that an image seen from each virtual camera can be displayed as a separate image on one screen.

The vertices processing and the pixel processing are realized by the hardware (the so-called programmable shaders such as the vertices shaders and the pixel shaders) that makes the polygon (primitive) drawing processing programmable by the shading program written in the shading language. The programmable shader has high degrees of freedom of the content of the drawing process since the processing at the vertices and the processing at the pixels are programmable. Therefore, the expressiveness can be significantly improved compared to the fixed drawing processing using conventional hardware.

When drawing an object, the image generator 120 performs geometry processing, texture mapping, hidden surface erasing processing, and a blending.

The image generator 120 performs processing such as coordinate transformation, clipping processing, perspective projection conversion, light source calculation or the like on the object in the geometry processing. The image generator 120 stores the object data (the position coordinate of the object's vertex, texture coordinate, color data (brightness data), normal line vector, or a value) after the geometry processing (after the perspective projection conversion) in the storage 170.

Texture mapping is a process for mapping a texture (a texture value) stored in the storage 170 to an object. Specifically, the image generator 120 reads out the texture (a surface property such as color (RGB) and an $\alpha$ value) from the storage 170 using the texture coordinate set (provided) to the vertices of the object. The image generator 120 maps a texture that is a two-dimensional image to an object. In this case, the process of matching pixels and tech cells, and bilinear interpolation as the interpolation of tech cells, and the like are performed.

As the hidden surface removal process, the image generator 120 performs a hidden surface removal process according to Z-buffering (a depth comparison method, a Z test) using a Z-buffer (a depth buffer) in which a Z-value (depth information) of a drawing pixel is stored. Namely, when drawing a drawing pixel corresponding to the primitive of an object, the image generator 120 refers to the Z value stored in the Z buffer. The image generator 120 compares the Z value of the referenced Z buffer with the Z value in the drawing pixel of the primitive. When the Z value in the drawing pixel is a Z value (for example, a smaller Z value) on the front side as viewed from the virtual camera, the image generator 120 performs drawing processing of the drawing pixel and updates the Z value of the Z buffer to a new Z value.

$\alpha$ blending ($\alpha$ compositing) refers to a translucent compositing process (straight $\alpha$ blending, additive $\alpha$ blending, or subtractive $\alpha$ blending) based on an $\alpha$ value (an A value).

For example, in a blending, the image generator 120 performs a linear compositing process based in the $\alpha$ value of a drawing color (a color to overwrite with) C1 to be drawn in the image buffer 172 and a drawing color (a basic color) C2 already drawn in the image buffer 172 (rendering target). In other words, when C denotes a final drawing color, the image generator 120 performs can obtain C according to $C=C1*\alpha+C2*(1-\alpha)$.

It should be noted that the $\alpha$ value is information that can be stored in association with each pixel (texel and dot) and is, for example, additional information other than color information. The $\alpha$ value can be used as mask information, translucent compositing process (equivalent to transparency and opacity), bump information, and the like.

The sound controller 130 performs the sound processing based on the results of various processing performed by the processor 100 and generates a game sound, such as a BGM, an effect sound, or a voice.

The display 190 outputs an image generated by the processor 100.

The functions of the display 190 are realized by hardware such as a CRT display, an LCD (liquid crystal display), an OELD (organic EL display), a PDP (plasma display panel), a touch panel display, or an HMD (head mount display).

The game device 10 may be connected to a display 190, such as a monitor or a television, and display the game image on the display 190 as an external output.

The sound output unit 192 outputs a sound that is reproduced by the sound controller 130. The function of the sound output 192 is implemented in hardware, such as a plurality of speaker units or headphones.

The sound output unit 192 may be disposed as a speaker provided in a display device. For example, when a television (a home television receiver) is used as a display device, a speaker of the television receiver is used as the sound output unit 192.

The communication unit 196 can communicate with other game device via a network (the Internet). The functions of the communication unit 196 are implemented by hardware, such as various processors or ASICs for communication, or a network interface card, programs, or the like. The communication unit 196 can communicate both wired communication and wireless communication.

The game device 10 may be controlled in a single player mode in which only one player is able to play or in a multiplayer mode in which multiple players are able to play. For example, in the case of controlling in the multiplayer mode, the game device 10 may transmit and receive data from the other game device 10 via a network to perform game processing, and one game device 10 may perform processing based on input information from a plurality of operation input sections 150.

1.2. Server

Figure 3:
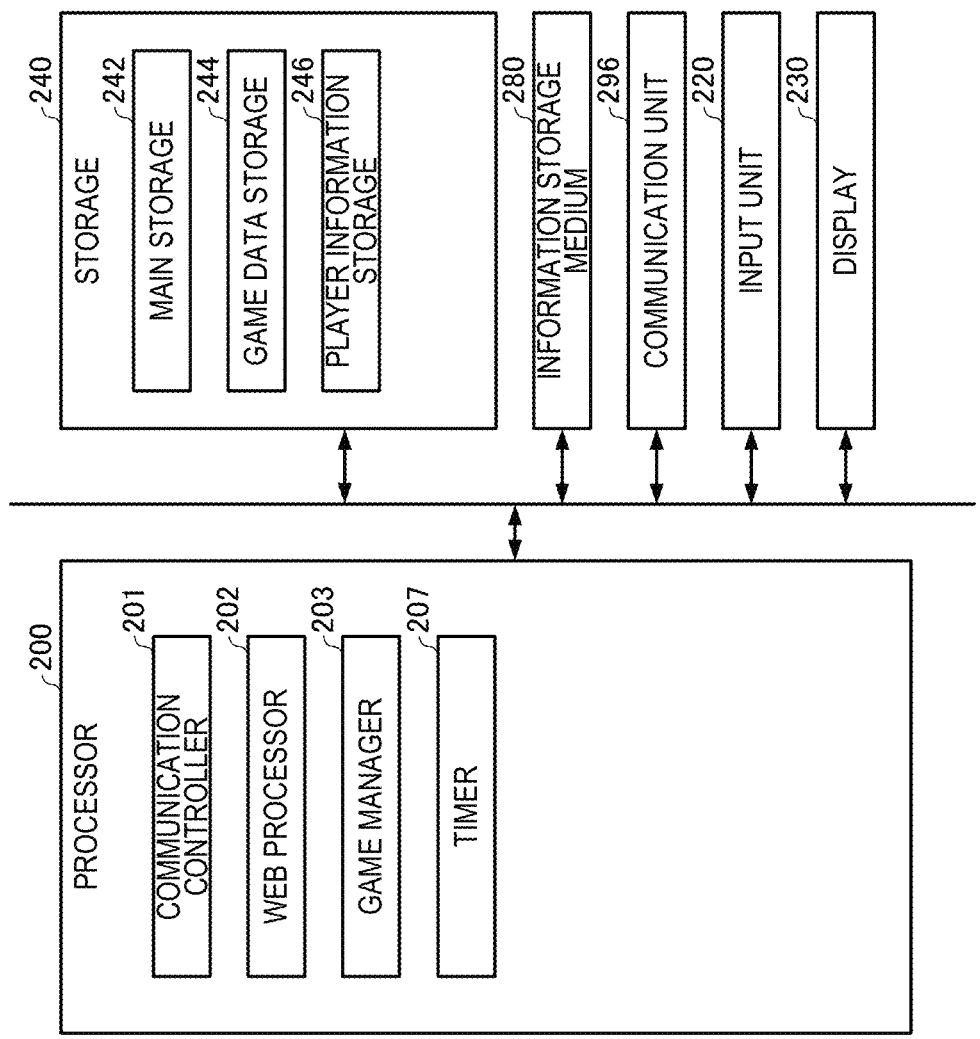
FIG. 3 is a diagram illustrating an example of a functional block diagram of the server of the first embodiment.

A configuration of the server 20 will be described with reference to FIG. 3. FIG. 3 is an example of a functional block diagram of the server 20. Further, the server 20 need not include all of the elements shown in FIG. 3, and may have a configuration in which the elements thereof are omitted.

The server 20 includes input unit 220 for use in an administrator or other input, display 230 for providing a predetermined display, information storage medium 280 for storing predetermined information, communication unit 296 for communicating with the game device 10 and other, processor 200 for executing processing relating to the game that is provided to the game device 10, and storage 240 for storing various data used for the game, mainly.

The input unit 220 is used by the administrator of the system for setting the game and other necessary information, and used for inputting data. For example, the input section 220 is implemented by a mouse, a keyboard, or the like.

The display 230 displays the operation image for the system administrator. For example, the display 230 is implemented by a liquid crystal display or the like.

The information storage medium 280 (a computer-readable medium) stores programs, data, and the like. The functions of the information storage medium 280 are implemented by an optical disc (CD or DVD), magnetic disc (MO), magnetic disc, hard disc, magnetic tape, or memory (ROM).

The communication unit 296 performs various controls for communicating with an external device (for example, a terminal and other servers and other network systems). The function of the communication unit 296 is implemented by hardware, such as various processors or communication ASICs, or programs.

The storage 240 is a work area of the processor 200 and the communication unit 296. The function of the storage 240 is implemented by a RAM (VRAM) or the like. The information stored in the storage 240 may be managed in a database.

In addition to the main storage 242, the storage 240 has:
(1) the game data storage 244 in which information (hereinafter referred to as "game information") relating to the game, including various table data to be used in performing the game processing and information (including initial values) of the game medium such as items to be provided to the player are stored, and
(2) a player information storage 246, in which information relating to the player (hereinafter referred to as "player information") is stored for each player.

In the first embodiment, the game medium is an item, game money or the like. For example, the game medium is provided as a virtual game medium in the game and can be acquired or used at a given timing in the game (not being owned by the player).

The processor 200 performs various processes using the main storage 242 in the storage 240 as the work area. The functions of the processor 200 are implemented by various processors (CPU, DSP, etc.) and hardware such as ASICs (gate array, etc.), or programs.

The processor 200 performs various processing of the first embodiment based on the program (data) stored in the information storage medium 280. In other words, in the information storage medium 280 in which a program (a program for causing the computer to perform the processing of each section) for causing the computer to function as the respective unit of the first embodiment is stored.

For example, the processor 200 performs control of the entire server 20 based on the program stored in the information storage medium 280 and performs various processing such as control of the transfer of data between the units. The processor 200 performs processing for providing various services in response to a request from the game device (terminal device) 10.

Specifically, the processor 200 includes at least a communication controller 201, a web processor 202, a game manager 203, and a timer 207.

The communication controller 201 performs processing for transmitting and receiving data with the game device 10 via the network. In other words, the server 20 performs various processing based on information received from the game device 10 or the like by the communication controller 201. In particular, the communication controller 201 performs processing for transmitting the game image to the game device 10 of the player based on a request from the game device 10 of the player.

The Web processor 202 functions as a Web server. For example, the web processor 202 performs processing for transmitting data in response to a request from a web browser installed in the game device 10 using a communication protocol such as HTTP (Hypertext Transfer Protocol), and processing for receiving data transmitted by the web browser of the game device 10.

The game manager 203 may perform the game processing based on the operation of the player input through the game device 10 in cooperation with the game device 10.

In particular, the game manager 203 provides the player with a game medium, such as an item used in the game, based on the player's instructions or at timing (before or during the start of the game) for each player.

The game manager 203 may cause the game to progress based on the player character, the object or item, parameters and the like in cooperation with the game device 10.

The timer 207 counts the time, and outputs the current time and a preset time to each unit based on a request from the game manager 203 or other parts. The timer 207 is used to synchronize with each terminal device.

2. Method

2.1. Overview

Next, the method of the first embodiment will be described. The game device 10 is an action RPG (RPG stands for a Role-Playing Game) in which the player character PC, together with the fellow characters AC1 and AC2 (the friend characters AC1 and AC2), plays against the enemy character EC, clears a plurality of stages, and ultimately achieves a target in a game space.

Specifically, the game of the first embodiment provides a world of games in which the character has a special ability (e.g., supernatural powers such as psychic powers) and in which the player character PC is able to move the object (object) without touching.

Figure 4:
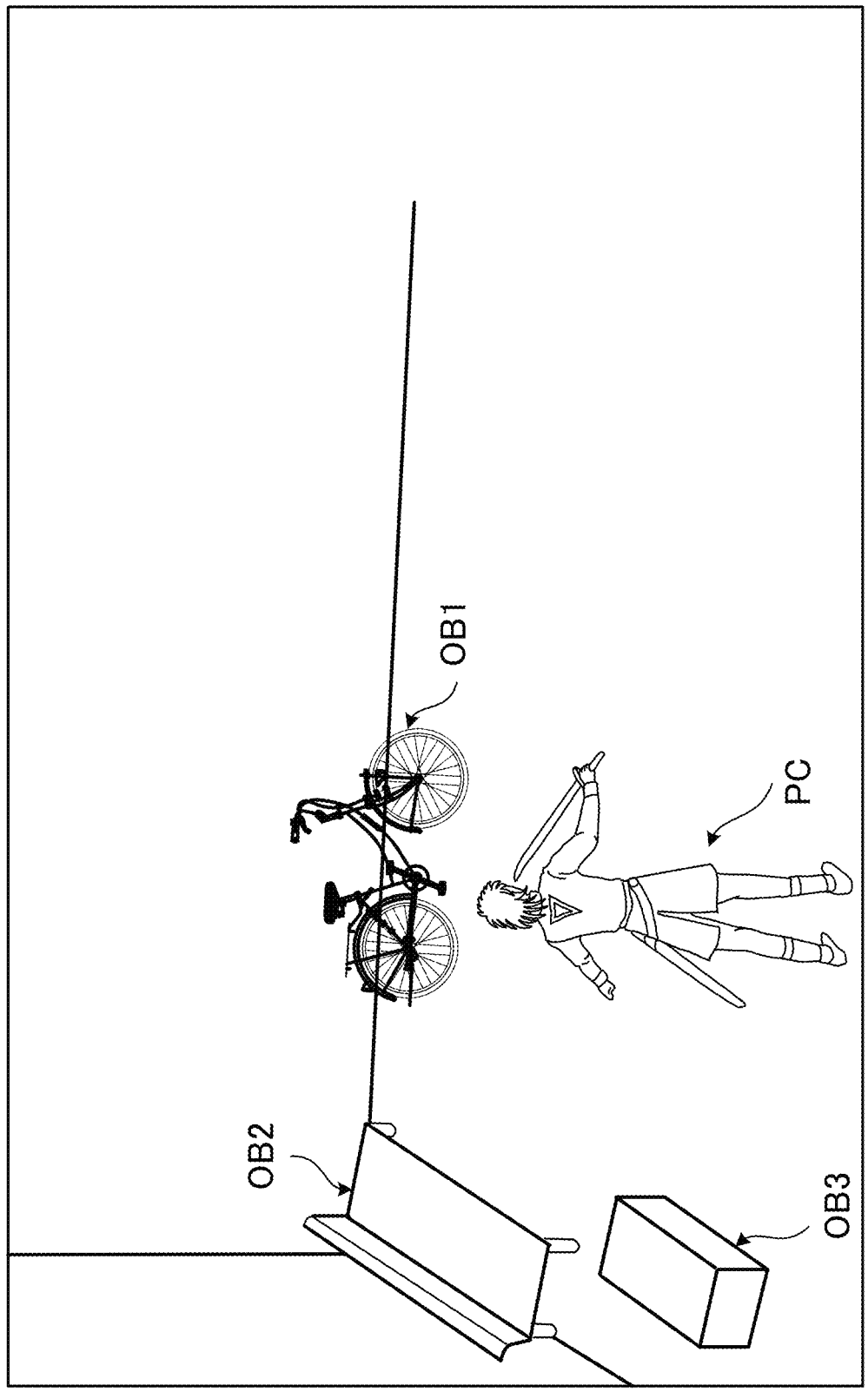
FIG. 4 is a diagram showing an example of the game image of the first embodiment.

FIGS. 4 to 7 show an example of the game image displayed on the display 190 of the game device 10. For example, as shown in FIG. 4, there is an object OB1 of a bicycle disposed away from the player character PC, a bench object OB2, and a drug object OB3 in the game space.

Figure 5:
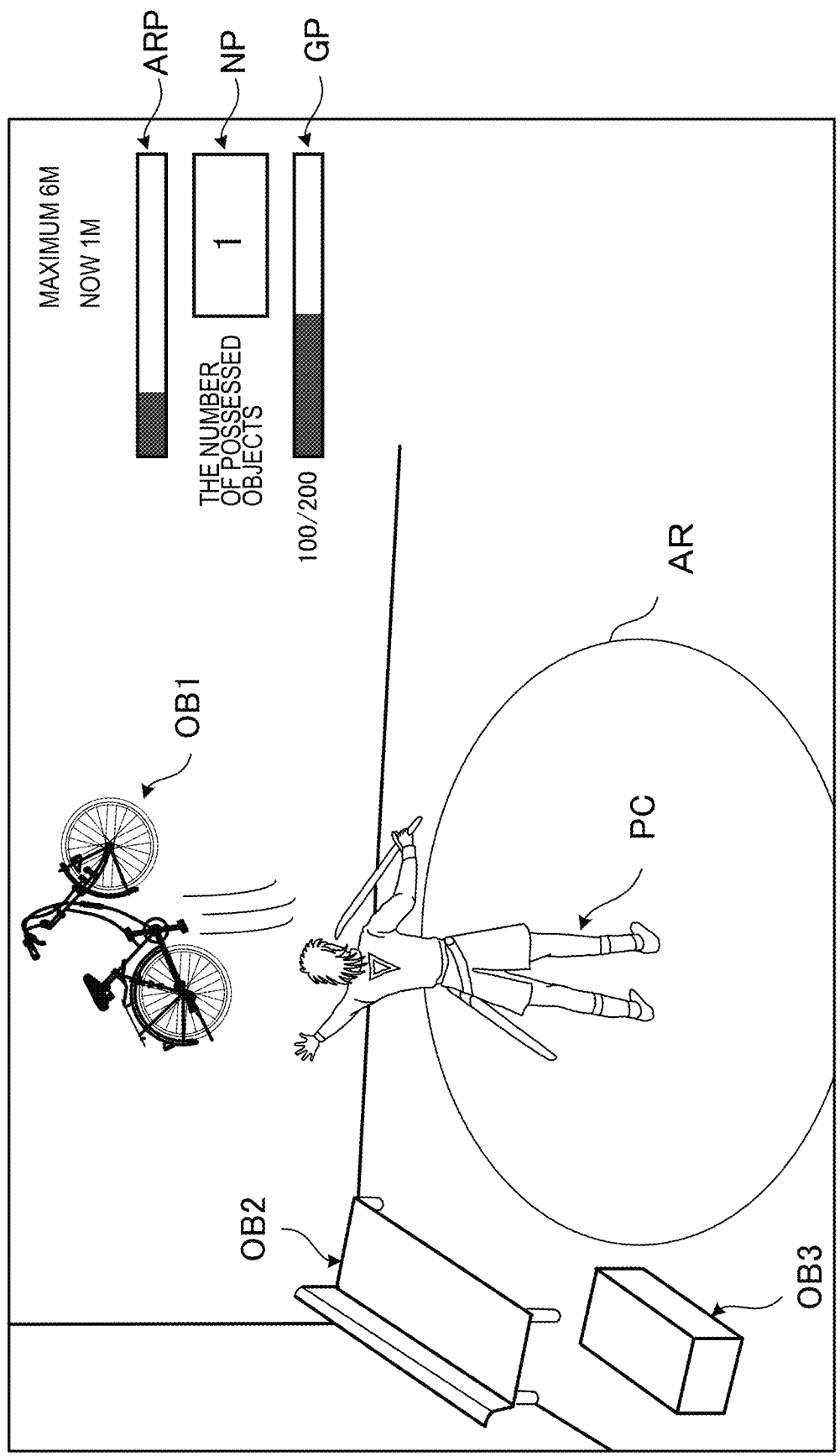
FIG. 5 is a diagram showing an example of the game image of the first embodiment.
Figure 6:
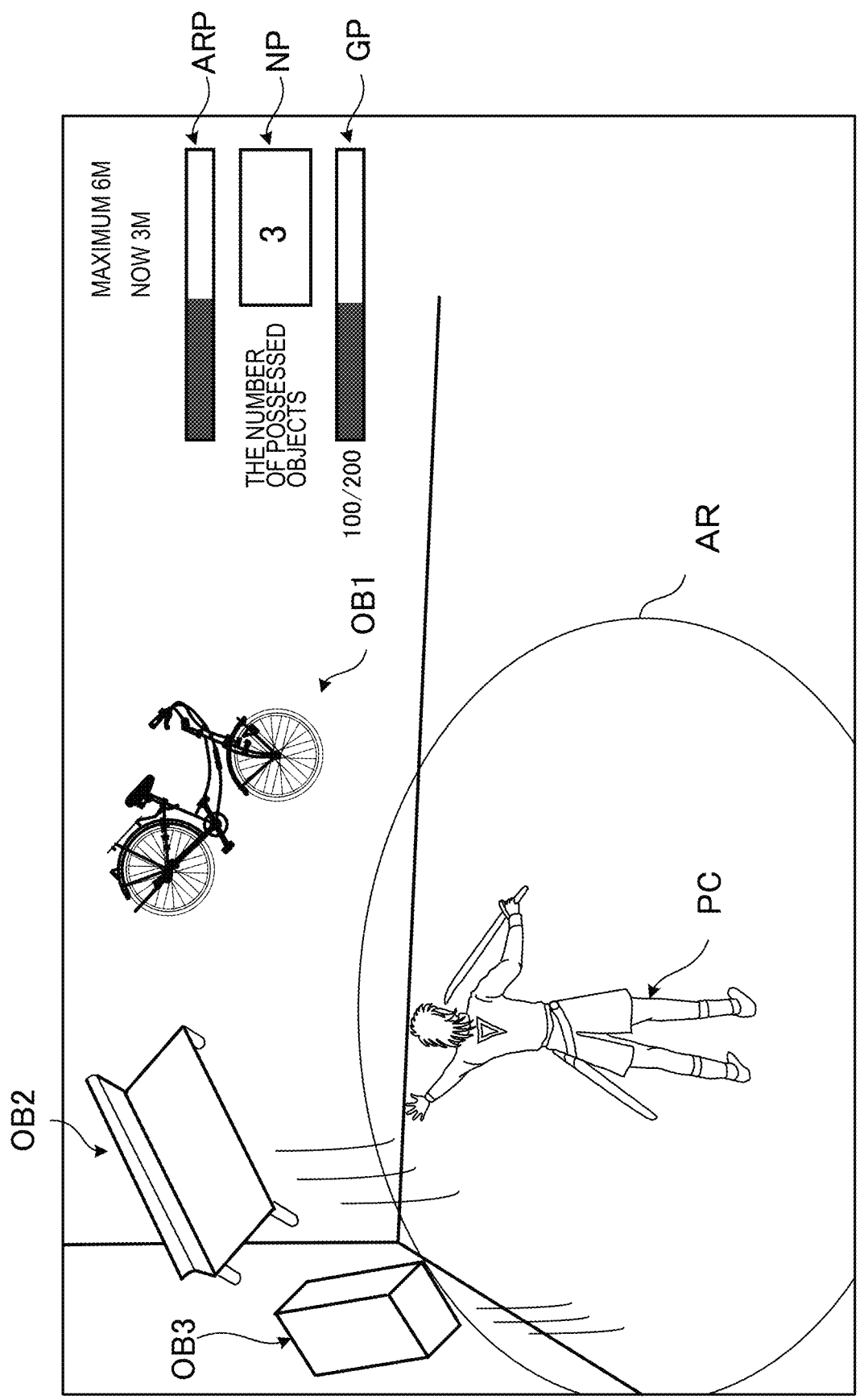
FIG. 6 is a diagram showing an example of the game image of the first embodiment.

When, for example, the object OB1 of the bicycle falls within a predetermined range AR set based on the position of the player character PC, as shown in FIG. 5, the object OB1 of the bicycle floats and is arranged in the game space while being suspended in the air. In other word, when the object OB1 of the bicycle places within the predetermined range AR, the operation of the object OB1 of the bicycle is suspended (on hold), and the object OB1 of the bicycle is arranged within the predetermined range AR. Therefore, in the game world of the first embodiment, a situation, in which the player character PC can lift the object OB1 of the bicycle by the psychic powers without touching the object OB1, can be created. When not only the bicycle object OB1 but also the bench object OB2 or the drug object OB3 can be placed within the predetermined range AR, the bench object OB2 and the drug object OB3 can be placed within the predetermined range AR in the holding state, as shown in FIG. 6.

Figure 7:
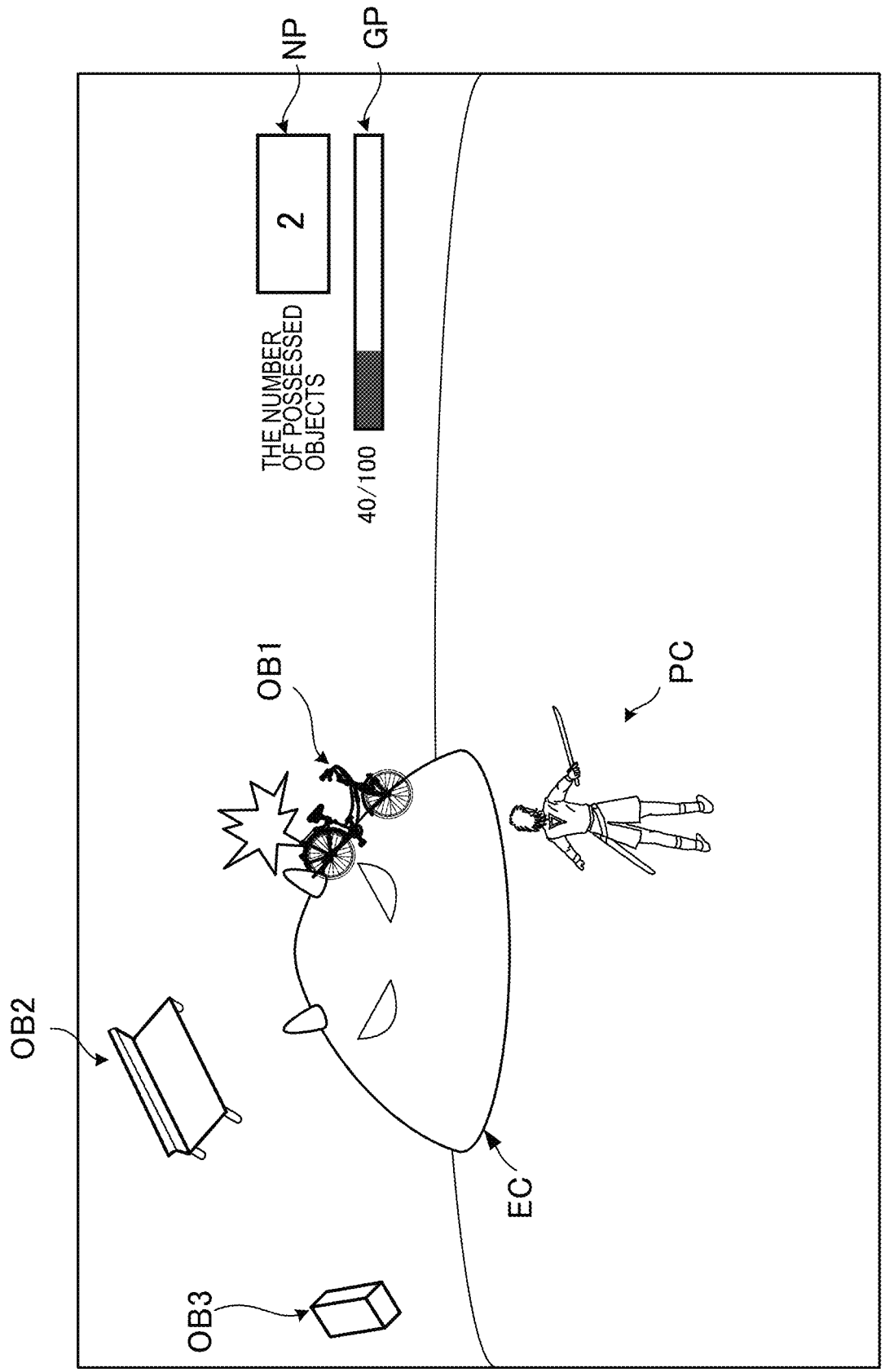
FIG. 7 is a diagram showing an example of the game image of the first embodiment.

When the operation instruction is received, the game device 10, for example, releases the holding state of the object OB1 of the bicycle as shown in FIG. 7, and performs an action to perform an attack such that the object OB1 of the bicycle is thrown against the enemy character EC.

As described above, the game device 10 can operate the object without the player character PC contacting the object. In other words, of the first embodiment, using the player character PC, since the game device 10 can create a world of games that can be manipulated without touching an object, the game device 10 can provide the player an attractive game.

2.2. Description of the Predetermined Range

First, a predetermined range of the first embodiment will be described in detail. Here, "predetermined range" is the range in which an object can be set in holding state.

The range setting processor 116 sets a predetermined range AR of a spherical shape in the game space based on the position of the player character PC. In other words, since the predetermined range AR is set based on the position of the player character PC, when the player character PC is moved, the predetermined range AR is also moved along with the movement of the player character PC.

Further, since the predetermined range AR is defined by three dimensions, when not only the object OB1 of the bicycle on the ground but also the object OB5 of the drone exists in the air can be placed within the predetermined range AR, the object OB5 can be set in the holding state. Both of a static object and a dynamic object can be set to an object in holding state.

Figure 8A:
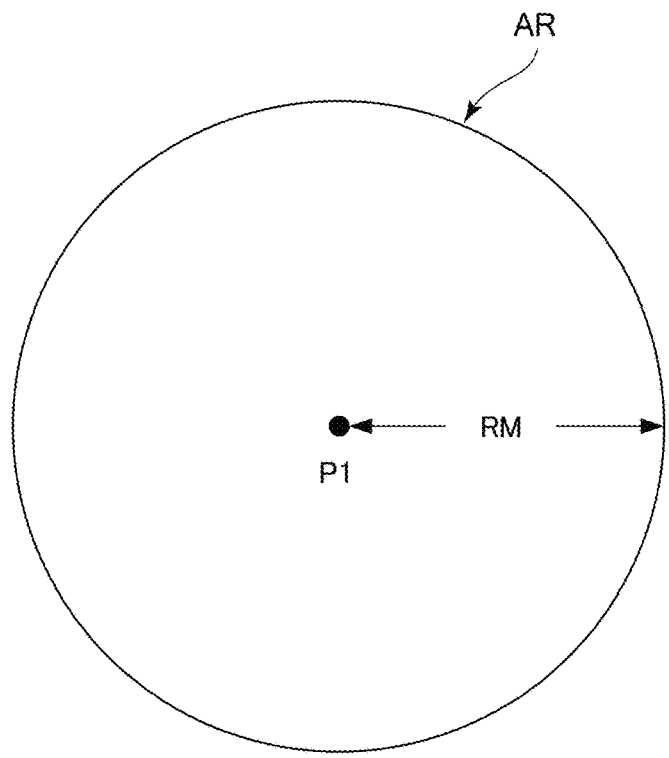
FIGS. 8A and 8B are diagrams illustrating a predetermined range of the first embodiment.

The predetermined range is described in more detail. As shown in FIG. 8A, the range setting processor 116 sets the range of the spherical shape having the radius RM in the game space as a predetermined range AR when the position P1 (the representative position) of the player character PC is centered. As an application example of the first embodiment, the range setting processor 116 may set the range of the cylindrical shape formed on the circle of the radius RM in the game space as a predetermined range AR when the position P1 of the player character PC is centered. The range setting processor 116 may set a predetermined three-dimensional range based on the position P1 of the player character PC as a predetermined range AR. For example, a predetermined range AR may be formed by a three-dimensional shape, such as spherical, cubic, or triangular pyramid, or may be formed by an amorphous shape with irregularities.

The range setting processor 116 receives range setting input information (for example, an input signal of an enlarged button) for expanding a predetermined range AR from the operation input unit 150 and sets a predetermined range AR for a period T during which the range setting input information is received. The game device 10 has a configuration in which a movement instruction for moving the player character PC can be received while receiving a predetermined range setting input (for example, pressing the enlarge button) of the player P. The game device 10 has a configuration in which the object can be set in holding state when the object is wound into the predetermined range AR.

The range setting processor 116 disables the setting of the predetermined range AR when the range setting input information is not accepted. Even after disabling the predefined range AR, the holding state is maintained for objects that have already been set in the holding state.

2.2.1. Expansion Control within the Predetermined Range

Figure 8B:
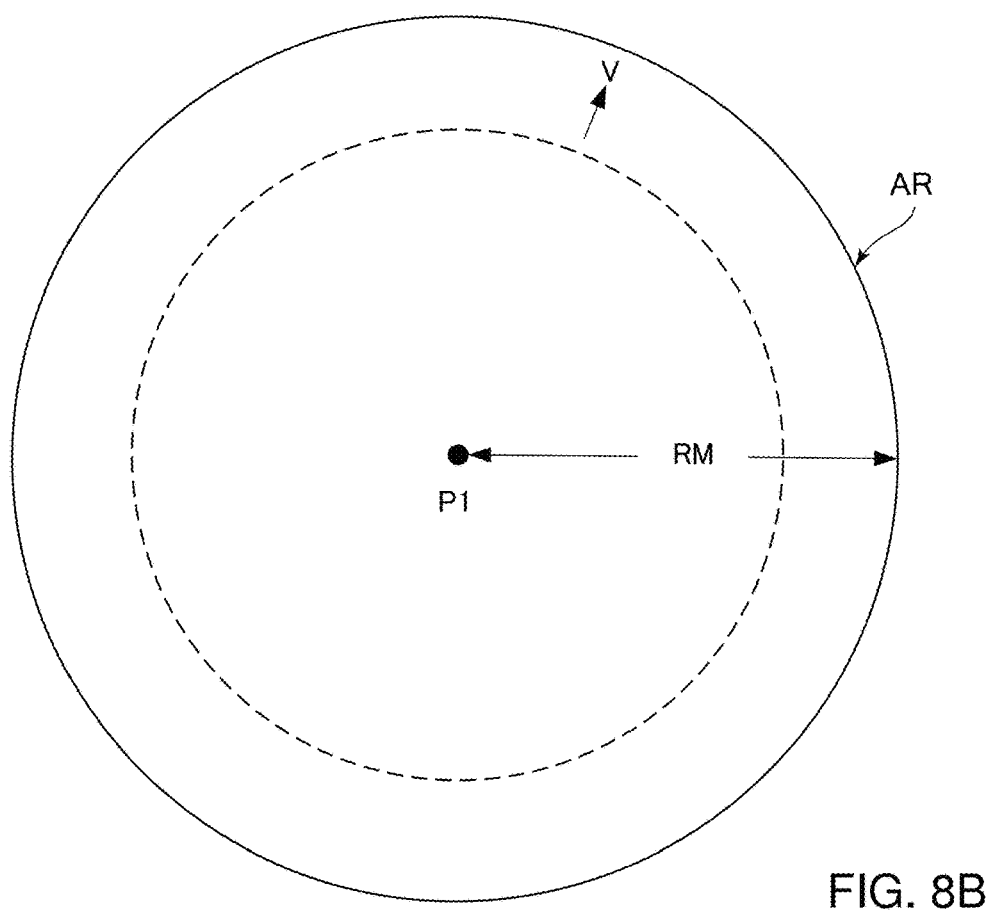

The range setting processor 116 expands predetermined range AR according to a period T during which the range setting input information (for example, an input signal of an enlarged button) is received. In other word, when the receiver 110 continuously receives the range setting input information, the range setting processor 116 expands the predetermined range AR based on the position P1 of the player character PC according to the period T (the input period T of the range setting input information) for which the range setting input information is continuously received, as shown in FIG. 8B.

For example, the range setting processor 116 controls predetermined range AR having spherical shape so as to have a longer radius of the spherical shape in proportion to the length of the input period T of the range setting input information. Specifically, when the input period of the range setting input information is 1 second, the range setting processor 116 expands the radius of the predetermined range AR having spherical shape from 0 m to 1 m. Further, when the input period of the range setting input information is 6 seconds, range setting processor 116 expands the radius of the predetermined range AR having spherical shape from 0 m to 6 m.

When a predetermined event is executed on the progress of the game, the range setting processor 116 may perform enlargement control such as further increasing the radius of predetermined range AR having the spherical shape to 2 m (or increasing the radius by 1.5 times) during the period of the event (from the start of the event to the end of the event).

The range setting processor 116 may perform enlargement control such as further increasing the radius of the predetermined range AR having the spherical shape to more 3 m (or doubling) for a predetermined period of time (for example, 60 seconds) when the player character PC uses an enlarged item such as "power-up item."

When expanding the predetermined range AR to the maximum expansion range, the range setting processor 116 maintains the size of the predetermined range AR having the spherical shape at the maximum expansion range.

2.2.2. Controlling the Predetermined Range of Size Based on the Predetermined Parameter The range setting processor 116 may change the size of a predetermined range based on predetermined parameter of the player character PC. Here, the "predetermined parameter" is a value representing the performance of the player character such as "capability value" or "level" of the player character PC.

The range setting processor 116 controls the maximum expansion range of the predetermined range AR so that the higher the capacity value ABP of the player character is, the larger the maximum expansion range of the predetermined range AR. In other words, the range setting processor 116 controls the radius RM of the maximum expansion range of the predetermined range AR having the spherical shape in proportion to the capability value ABP of the player character. Specifically, when the capacity value ABP of the player character PC is 10, the range setting processor 116 sets the radius RM of the maximum expansion range of the predetermined range AR having the spherical shape to 1 m, and when the capacity value ABP of the player character PC is 60, the range setting processor 116 sets the radius RM of the maximum expansion range of the predetermined range AR having the spherical shape to 6 m. As described above, as the player character PC grows, the maximum expansion range of the predetermined range AR expands. Therefore, the player P can play the game while enjoying the growth of the player character PC.

2.2.3. Controlling the Expansion Speed of the Predetermined Range Based on the Predetermined Parameter The range setting processor 116 may determine the expansion speed when the predetermined range expands based on predetermined parameters of the player character. The faster the expansion speed of a predetermined range, the faster the object can be set in holding state. Therefore, the faster the expansion speed is, the greater the player P has an advantage.

For example, the range setting processor 116 controls the expansion speed so that the greater the capacity value ABP of the player character is, the faster the expansion speed of the predetermined range AR. In other words, the range setting processor 116 controls the expansion speed V (unit: m/s) of the predetermined range AR having the spherical shape in proportion to the capability value ABP of the player character. Specifically, when the capacity value ABP of the player character PC is 10, the range setting processor 116 sets the expansion speed V to 1 m per second, and when the capacity value ABP of the player character PC is 60, the range setting processor 116 sets the expansion speed V to 6 m per second. As described above, since the expansion speed of the predetermined range AR increases with the growth of the player character PC, the player P can play the game while enjoying the growth of the player character PC.

2.2.4. Visualization of the Predetermined Range

The display controller 118 identifies and displays a predetermined range AR by a given color while a predetermined range AR is set. For example, as shown in FIGS. 5 and 6, the display controller 118 may identify and display the plane where the ground and the wall intersect the predetermined range AR having the spherical shape, using a predetermined color (e.g., purple), as the predetermined range AR. The display controller 118 may identify and display the predetermined range AR itself having the spherical shape, using a predetermined color. The display controller 118 may identify and display the ground part of the predetermined range AR having the spherical shape, using a predetermined color.

As shown in FIGS. 5 and 6, the display controller 118 may also display the radius of the current predetermined range AR having the spherical type (e.g., 1 m according to FIG. 5) and the radius RM of the maximum expansion range of the predetermined range AR having the spherical type (e.g., 6 m according to FIG. 5) on the game image, and display the radius RM of the current predetermined range AR by a gauge ARP. By controlling in this way, the player can easily recognize the size of the current predetermined range AR.

2.3. Holding Control

Next, the holding control of the first embodiment will be described. The holding controller 115 sets the designated object from among the objects existing in the game space, as the object in the holding state, and performs a process of arranging the object in the holding state at a predetermined position in the game space.

Here, "setting the object to a holding state" means a state in which an object is ensured (held and acquired) corresponding to a player character, and the operation of the object is held. The game device 10 arranges the object in the holding state, on the game image, in such a state that object is suspended in the air at a distance from the ground plane of the game space or that the object is continuously oscillating in the air. The hold controller 115 may change the display (appearance) of the object in the holding state. For example, the hold controller 115 changes the color of the object in the holding state. Specifically, for example, the hold controller 115 may combine pixel values of a specific color (for example, blue) with pixel values of the object in the holding state, and change pixel values of the object set to a holding state. The game device 10 stores in the storage 170 (the information storage medium 180 or the like) the object (the object ID, the type of object, the number of objects, or the like) ensured corresponding to the ID of the player character or the player ID.

2.3.1. Example of Configuring an Object in the Holding Status

The hold controller 115 sets an object designated by a computer (CPU) from among the objects exist within the predetermined range AR as the object in the holding state. For example, the hold controller 115 sets the object that is set to holdable beforehand, from among the objects that exist in a predetermined range AR, as the object in the holding state.

The display controller 118 may identify and display the objects that is set to holdable. By controlling in this way, the player P can move the player character PC to ensure the object that is set to holdable.

2.3.2. Object Information

FIG. 9 is a diagram showing an example of the information of each object. The information of each object is stored in the storage 170 (the information storage medium 180 may be used) corresponding to the ID of the player character PC or the ID of the player P.

For example, as shown in FIG. 9, the object name, type, holding allowable flag, holding state flag, weight, attribution, and consumption value are set for each object corresponding to the object ID.

When it is the object that can be designated by a computer (CPU) or a player from among the objects that exist in the game space, the holding allowable flag is set to "1", and when it is not the object that can be designated by a computer (CPU) or a player, the holding allowable flag is set to "0". The game device 10 may control the updating of the holding allowable flag of each object according to the growth (capability value) of the player character PC. For example, the greater the capability value of the player character PC is, the greater the game device 10 may increase the number and type of the objects that update the holding allowable flag from 0 to 1. By controlling in this way, as the player character grows, many kinds of objects can be held, thus increasing the amusement of the game.

The holding state flag is set to "1" when the object is currently in the holding state and to "0" when the object is not currently in the holding state. For example, in the example of FIG. 6, the holding state flag of the object OB1 of the bicycle, the object OB2 of the bench, and the object OB3 of the drug are set to "1", and each object is currently in the holding state.

2.3.3. Arrangement of the Object in the Holding State

The holding controller 115 places an object in the holding state at a predetermined position in the game space. For example, as shown in FIG. 10A, the holding controller 115 places the object OB1 of the bicycle in the holding state at position Q1 at a predetermined distance (for example, 10 m) in the upward direction (Y direction) with reference to the position P1 of the player character PC.

In the game space, the holding controller 115 places the object in the holding state in the game space so as to follow the change in the position P1 of the player character PC. In other words, when the player character PC moves and the position P1 of the player character changes, the holding controller 115 changes the position Q1 while the position P1 and the position Q1 of the object OB1 of the bicycle maintain a position relationship between the position P1 and the position Q1. By controlling in this way, since the object OB1 in the holding state is placed so as to follow the change in the position P1 of the player character PC even when the player character PC moves, the player can recognize position of the object OB1 in the holding state without losing sight.

The hold controller 115 may allow each object in the holding state to come to rest at a predetermined position. Note that the holding controller 115 may perform operation control such that each object in the holding state is suspended in the air with reference to a predetermined position. For example, the holding controller 115 may perform predetermined operation control (for example, each object oscillates back and forth and around and continues to rotate) for each object in the holding state with respect to at least one of the positions and orientations of each object. In this way, the player can easily recognize the object in the holding state since the object in the holding state moves differently from the normal object.

2.3.4 Control for Setting the Plurality of Objects in the Holding State

The holding controller 115 may set a plurality of objects individually or collectively as objects in the holding state.

Figure 10B:
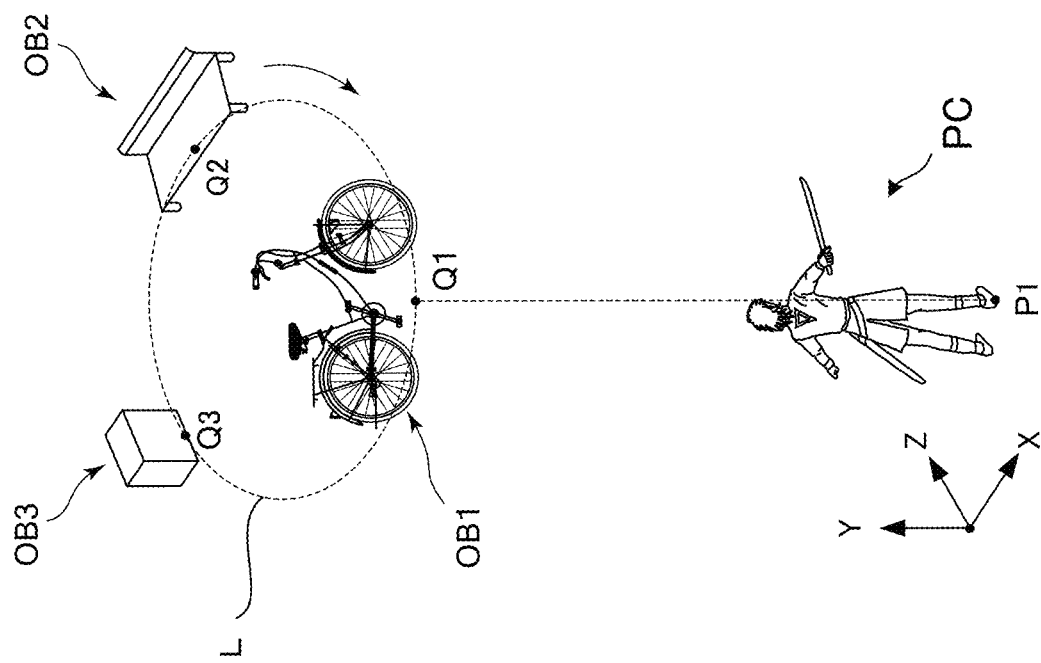
FIGS. 10A and 10B are diagrams illustrating an example of an arrangement of the object in the holding state of the first embodiment.
Figure 10A:
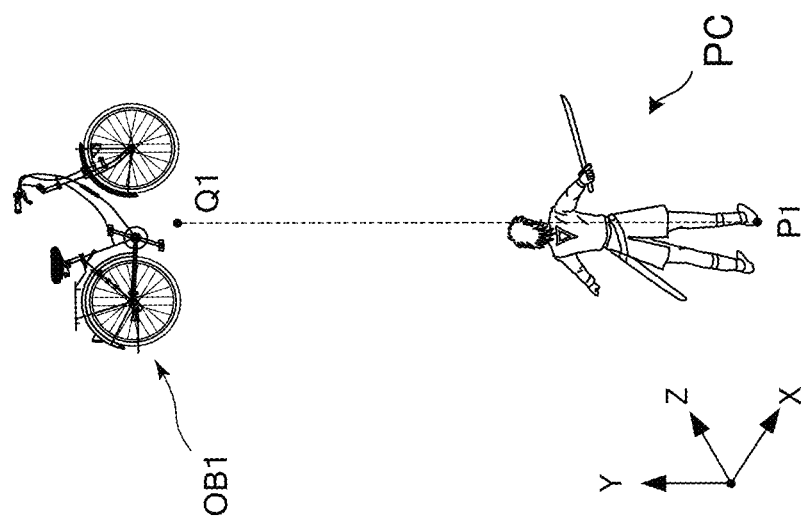

When a plurality of objects OB1, OB2, and OB3 in the holding state exists, as shown in FIG. 10B, the holding controller 115 determines the order of the plurality of the objects OB1, OB2, and OB3 in the holding state.

First, the holding controller 115 assigns an identification number (order) to the objects, according to the order in which the object is ensured as the object in the holding state. When the plurality of objects is ensured at the same time, the holding controller 115 may assign different numbers or the same numbers. The game device 10 stores the identification number of each object in the holding state in the storage 170 (or the information storage medium 180) corresponding to the player character ID.

The holding controller 115 places the objects in ascending order. For example, as shown in FIG. 10B, when the first object OB1 of the bicycle is determined, the second object OB2 of the bench is determined, and the third object of the drug is determined to be OB3, the first object OB1 of the bicycle is placed at position Q1 where is upward in predetermined distance (e.g., 10 m) apart from on the position P1 of the player character PC.

The holding controller 115 places the object OB2 of the second bench at the same height (Y value) as the position Q1 and the position Q2 adjacent to the position Q1 in the XZ plane. The holding controller 115 places the third drug object OB3 at the same height (Y value) as the position Q1 and the position Q3 adjacent to the position Q2 in the XZ plane. For example, the holding controller 115 may place positions Q1, Q2, and Q3 on a predetermined trajectory L (e.g., a trajectory of a circle, a trajectory of an ellipse), as shown in FIG. 10B.

The holding controller 115 places the objects OB1, OB2, and OB3 in the holding state so as to follow the change in the position P1 of the player character PC. In other words, when the player character PC moves and the position P1 of the player character changes, the holding controller 115 changes the positions Q1, Q2, and Q3 while maintaining the position relationship between position P1 and positions Q1, Q2, and Q3.

As shown in FIG. 6, the display controller 118 displays the number of objects in the current holding state as the holding number NP on the display 190. According to the example of FIG. 6, since the number of objects in the current holding state is three, the display controller 118 displays the holding number "3." The game device 10 basically produces an image visible from the rearward viewpoint of the player character PC. Note that when the number of objects in the holding state is displayed, for example, even when the object out of view is present, the player can accurately recognize the number of objects in the current holding state.

2.3.5 Example of Decision Processing to Determine Whether to Set to the Holding State The holding controller 115 may determine whether or not to set the object to a holding in accordance with at least one of the distance between the player character PC and the object, which exists in a predetermined range AR, the type of the object, the attribution of the object, and the compatibility between the player character and the object. Here, the type of the object is the individual sets of the objects grouped according to a common property, and for example, the type of the object includes the concept of the weight of the object.

2.3.5.1. Example 1 of the Decision Processing to Determine Whether to Set to the Holding State For example, the holding controller 115 may determine the probability of setting the object (the object for which the holding allowable flag is set to 1) existing within the predetermined range AR to the holding state, and determine whether or not the object is set in the holding state based on the probability.

<Probability of Distance>

The holding controller 115 may control the probability that an object existing within the predetermined range AR is set to a holding state according to the distance between the player character and the object.

For example, the holding controller 115 sets the probability so that the farther the distance between the position P1 of the player character is, the lower the probability of setting the object in the holding state is. In other words, the holding controller 115 sets the probability so that the nearer the distance between the position P1 of the player character is, the higher the probability of setting the object in the holding state is.

Specifically, when the object OB1 of the bicycle exists within a predetermined range AR and the distance D between the player character PC and the object OB1 of the bicycle is within 1 m (D<=1), the holding controller 115 sets the object OB1 of the bicycle in the holding state with the 80% probabilities. On the other hand, when the bench object OB2 exists within the predetermined range AR, and when the distance D between the player character PC and the bench object OB2 is more than 1 m and less than 5 m (1<D<=5), the holding controller 115 sets the bench object OB2 in the holding state with the 20% probabilities.

<Probability of Weight>

For example, the holding controller 115 may control the probability of setting the object to the holding state according to the weight of the object that exists within a predetermined range AR.

For example, as shown in FIG. 9, each object has a predetermined weight. For example, the holding controller 115 sets the probability so that the heavier the object is, the lower the probability of setting the object in the holding state is. In other words, the lighter the object is, the higher the probability of setting the object in the holding state.

Specifically, when the object OB4 of the vehicle exists within the predetermined range AR and the weight of the object OB4 of the vehicle is 1600 kg, the holding controller 115 sets the object OB4 of the vehicle in the holding state with the probability of 10%. On the other hand, when the object OB 11 of the nail exists within the predetermined range of AR and the object OB 11 of the nail is 0.1 kg in weight, the holding control 115 sets the object OB 11 of the nail in the holding state with the 90% probabilities.

<Probability of Distance and Weight>

The holding controller 115 may control the probability of setting an object within a predetermined range AR in a holding state based on the distance between the player character and the object and the weight of the object.

Specifically, when the object OB4 of the vehicle is within the predetermined range AR and the weight of the object OB4 of the vehicle is 1600 kg, when the distance D between the player character PC and the object OB4 of the vehicle is less than 3 m (D<=3) the holding controller 115 sets the holding state with the 50% probabilities, and when the distance D between the player character PC and the object OB4 of the vehicle is greater than 3 m and more than 6 m (3<D<=6), sets the holding state with the 20% probabilities.

When an object OB11 of the nail that is lighter than the object OB4 of the vehicle exists in a predetermined range AR, the holding controller 115 increases the probability of the object OB11 of the nail higher than the object OB4. For example, when the object OB 11 of the nail weighs 0.1 kg and the distance D between the player character PC and the object OB 11 of the nail is less than 3 m (D<=3), the holding controller 115 sets the holding state with the 90% probabilities. When the distance D between the player character PC and the nail object OB 11 is larger than 3 m and less than 6 m (3<D<=6), the holding controller 115 sets the holding state with the 80% probabilities.

2.3.5.2. Example 2 of the Decision Processing to Determine Whether to Set to the Holding State The hold controller 115 may determine whether or not to set an object (an object for which the holding allowable flag is set to 1) existing within the predetermined range AR to the holding state based on the predetermined condition.

For example, the holding controller 115 may determine whether or not to set an object existing within the predetermined range AR to a holding state according to the distance between the player character and the object, and weight of the object.

For example, when the distance D between the player character PC and the object is less than 1 m (D<=1), the holding controller 115 sets the holding state to all of the objects without the weight. When the distance D between the player character PC and the object is greater than 1 m and less than 2 m (1<D<=2), the holding controller 115 controls for setting the object of less than 2000 kg to the holding state and does not control for setting the other objects to the holding state. When the distance D between the player character PC and the object is greater than 2 m and less than 3 m (2<D<=3), the holding controller 115 controls for setting the object of less than 1000 kg to the holding state and does not control for setting the other objects to the holding state. When the distance D between the player character PC and the object is greater than 3 m and smaller than 4 m (3<D<=4), the holding controller 115 controls for setting the object of less than 100 kg to the holding state and does not control for setting the other objects to the holding state. When the distance D between the player character PC and the object is greater than 4 m and smaller than 5 m (4<D<=5), the holding controller 115 controls for setting the object of less than 10 kg to the holding state and does not control for setting the other objects to the holding state. When the distance D between the player character PC and the object is greater than 5 m (5<D), the holding controller 115 controls for setting the object of less than 1 kg to the holding state and does not control for setting the other objects to the holding state.

2.3.5.3. Example 3 of the Decision Processing to Determine Whether to Set to the Holding State The hold controller 115 may determine whether or not the object (an object for which the holding allowable flag is set to 1) existing within the predetermined range AR is set to a holding state according to the attributions of the object.

For example, the hold controller 115 may control for setting the object having the specific attribution to the holding state and may not control for setting the object having the other attribution to the holding state. Specifically, when the object has five kinds of attributions, "water," "fire," "tree," "light," and "dark," the holding controller 115 controls for setting the object having the attribution of "water," "fire," and "tree" to the holding state, and does not control for setting the object having the attribution of "light" and "dark" to the holding state.

2.3.5.4. Example 4 of the Decision Processing to Determine Whether to Set to the Holding State The holding controller 115 may determine whether or not the object (an object in which the holding allowable flag is set to be 1) existing within the predetermined range AR is set to the holding state according to the compatibility of the player character and the object.

Here, the compatibility of the player character and the object is, for example, the compatibility of the player character and the object with respect to an attribution, or with respect to a type.

For example, the holding controller 115 may control for setting the object, which having the same attribution as the attribution of the player character, to the holding state, and may not control for setting the object, which has the attribution different from the attribution of the player character, to the holding state. Specifically, for example, when the attribution of the player character is "water," the holding controller 115 controls for setting the object having the attribution of "water" to the holding state, and does not control for setting the object having the attribution of "fire," "tree," "light" and "darkness" to a holding state.

The compatibility may be determined by an element other than an attribution. For example, a type of an object that is compatible with a type of player character (character, sex, skill, or the like) and a type of an object that is incompatible with a type of player character are predetermined. In such case, the holding controller 115 may control for setting the object of a type that is compatible with a type of player character, to the holding state, and does not control for setting the object of a type that is incompatible with a type of player character, to the holding state.

2.3.6 Example of Changing the Number, Attributions, and Type of Objects that can be Set to the Holding State The holding controller 115 changes at least one of a number of objects, an attribution, and a type of objects that can be set to the holding state according to predetermined parameters (for example, a capability value) of the player character PC.

Here, "the number of objects that can be set to the holding state" means the maximum number of objects that can be set to the holding state.

For example, the higher the capability value ABP of the player character PC is, the greater the number of objects that can be set to the holding state increases. For example, the holding controller 115 increases the number K of objects that can be set to the holding state in proportion to the ability value ABP of the player character. Specifically, when the capability value ABP of the player character PC is 10, the holding controller 115 sets the number K of objects that can be set to the holding state to 10, and when the capability value ABP of the player character PC is 60, the number K of objects that can be set to the holding state to 60. As described above, as the player character PC grows, the number of objects in the holding state that can be ensured increases. Therefore, the player P can play the game while enjoying the growth of the player character PC.

The "object attribution that can be set to the holding state" is an attribution of the object in the holding state that can be ensured. For example, the higher the capability value of the player character PC is, the more many types of attributions regarding the object that can be set to the holding state is.

More specifically, for example, there are five types of object attributions, water, fire, tree, light, and darkness. When the capability value of the player character PC is 1 to 50, the holding controller 115 sets the object having the "water" attribution to the holding state only. When the capacity value of the player character PC is 51 to 90, the holding controller 115 sets the objects having the attributions of "water," "fire," and "tree" to the holding state only. Further, when the capacity value of the player character PC is 90 to 100, the holding controller 115 sets the object of all five kinds of attributions, "water," "fire," "tree," "light," and "darkness" to the holding state. The "type of object that can be set the holding state" is the type of object that the player character PC can ensure the object in the holding state.

For example, the higher the capability value ABP of the player character PC, the more types of objects that can be set to the holding state increase. FIG. 11 is a diagram illustrating a correlation between a capability value ABP of a player character and an object type that can be set to the holding state. As shown in FIG. 11, for example, when the capacity value ABP of the player character PC is 10, the holding controller 115 sets the nail object to the holding state. However, when the capacity value ABP of the player character PC rises to 11, the holding controller 115 sets the nail object and the bicycle object to the holing state. As described above, with the growth of the player character PC, the variety of objects in the holding state that can be ensured increases. Therefore, the player P can play the game while enjoying the growth of the player character PC. The type of object may be separated by object weight, material (metal, wood, water), etc.

The holding controller 115 may change at least one of the number of objects, the attribution, and the type of objects that can be set to the holding state according to the information (for example, an attribution) of the player character PC. For example, the holding controller 115 may handle, as the object that can set to the holding state, the object having the same attribution as the player character PC. In other words, when the attribution of the player character PC is "water," the holding controller 115 sets the object having the attribution of "water" as the object that can be set to the holding state.

2.4. Operation Control

Next, an operation control of the object of the first embodiment will be described. When the predetermined conditions are satisfied, the operation controller 112a releases the holding state of the object set to the holding state, and executes the operation of the object. In other words, the operation controller 112a transitions the object set in the holding state from the holding state to the operating state. The operation controller 112a performs predetermined operations (motion and animation) of the object. The operation controller 112a may also perform the operation of the player character itself in accordance with the operation of the object.

Here, "when the predetermined condition is satisfied" means when an operation instruction is received from the player or when an operation instruction is given by the CPU (computer), or the like.

For example, when the operation instruction is received by the receiver 110, the operation controller 112a releases the holding state of the object set in the holding state, and operates the object based on the operation contents (motion data and animation data) corresponding to the operation instruction. The contents of the operation include the operation of the attack, the operation of the defense and the operation of the recovery. The game device 10 stores the operation contents in advance in the storage 170 or the information storage medium 180.

The game device 10 assigns an operation to each operation instruction beforehand. For example, a triangular button operation input is assigned for a motion instruction E1, a circle button operation input is assigned for a motion instruction E2, and a square button operation is assigned for a motion instruction E3.

When the player operates on the touch panel, for example, the game device 10 assigns a flick operation (broadly, a touch operation) of the first region of the touch panel to the operation instruction E1, assigns a flick operation of the second region of the touch panel to the operation instruction E2, and assigns a flick operation of the third region of the touch panel to the operation instruction E3.

The game device 10 extinguishes the object, whose operation is terminated by the operation controller 112a, from the game space. When the holding state of the object is released by the operation controller 112a, the hold controller 115 subtracts the number of objects that are released from the holding state from the number of objects (the number of possessed objects) that are in the current holding state.

2.4.1. Operation Control of Attacks

First, the operation control of an attack is described. When one operation instruction received by the receiver 110 is an attack instruction, the operation controller 112a operates the object based on the operation contents corresponding to the attack. For example, when the instruction designates the enemy character to be locked on (as the attack target) based on the operation input (the operation instruction) of the player, the operation controller 112a causes the object to attack (fired) to the enemy character of the lock-on target (the attack target).

When the instruction does not designate the enemy character to be locked on based on the instruction operation (operation input) of the player, the operation controller 112a causes the object to attack (launch) in the direction in which the player character is facing. When there is no enemy character in the direction where the player character is facing, the attack may fail. The operation controller 112a may cause an object to execute an operation for attacking (firing) to an enemy character that the computer (CPU) automatically indicates to lock on.

In particular, the operation of the attack of the first embodiment includes a plurality of operation contents of "near-range attack," "long-range attack," and "strike down." The game device 10 previously stores in the storage 170 or the information storage medium 180 the operation contents corresponding to a plurality of kinds of operation instructions.

For example, the receiver 110 receives any one of a plurality of types of operation instructions for the object. The operation controller 112a operates the object based on the operation contents corresponding to a single operation instruction received by the receiver 110.

For example, as shown in FIG. 7, when the operation instruction E1 of the "near attack" is received, the operation controller 112a releases the holding state of the bicycle object OB set in the holding state, and executes the operation of the near-range attack using the bicycle object OB1 such that the bicycle object OB1 is launched at a close distance from the enemy character EC to be locked on for colliding with (hitting) the enemy character EC.

When the operation instruction E2 of the "long-range attack" is received, the operation controller 112a releases the holding state of the bicycle object OB1 set in the holding state, and executes the operation of the long-range attack using the bicycle object OB1 so that the bicycle object OB1 is fired against the enemy character EC to be locked-on that is located at a predetermined distance (20 m or more) from the player character PC and is collides with the enemy character EC. By controlling in this way, even when the enemy character EC is far from the player character PC, for example, the player is able to attack the enemy character EC.

When the action instruction E3 of "strike down" is received, the operation controller 112a releases the holding state of the bicycle object OB1 set to the holding state, and performs an operation of the bicycle object OB1 so as to strike the bicycle object OB1 off the overhead (Y minus direction) of the enemy character EC to be looked-on, for example. For example, a strike-down attack may be effective when there is a weakness over the enemy character EC.

When, for example, the object OB1 hits (collides) the enemy character EC, the game device 10 performs a process of subtracting offensive power parameter (attack value) equivalent to the object OB1 from the power value (HP value) of the enemy character, thereby causing damage. The game device 10 controls such that the higher the object, the higher offensive power parameter.

Further, as the operation of an attack by the object, instead of damaging the enemy character, the operation controller 112a may control an operation for reducing the foothold (movement blocking) of the enemy character and the ability of the enemy character. Further, as an operation of an attack by an object, instead of firing the object itself to an enemy character, an operation may be performed in which a gun attack or an explosion is carried out on the spot to damage the enemy character. In addition, even when the operation instructions are the same, the power (offensive power) and the effect (the distance of the object, the inductive accuracy, etc.) may differ depending on the type of object and the individual differences.

2.4.2. Operation Control of the Defense

Next, the operation control of the defense will be described. When one operation instruction received by the receiver 110 is a defense instruction, the operation controller 112a operates the object based on the operation contents corresponding to the defense.

Figure 12:
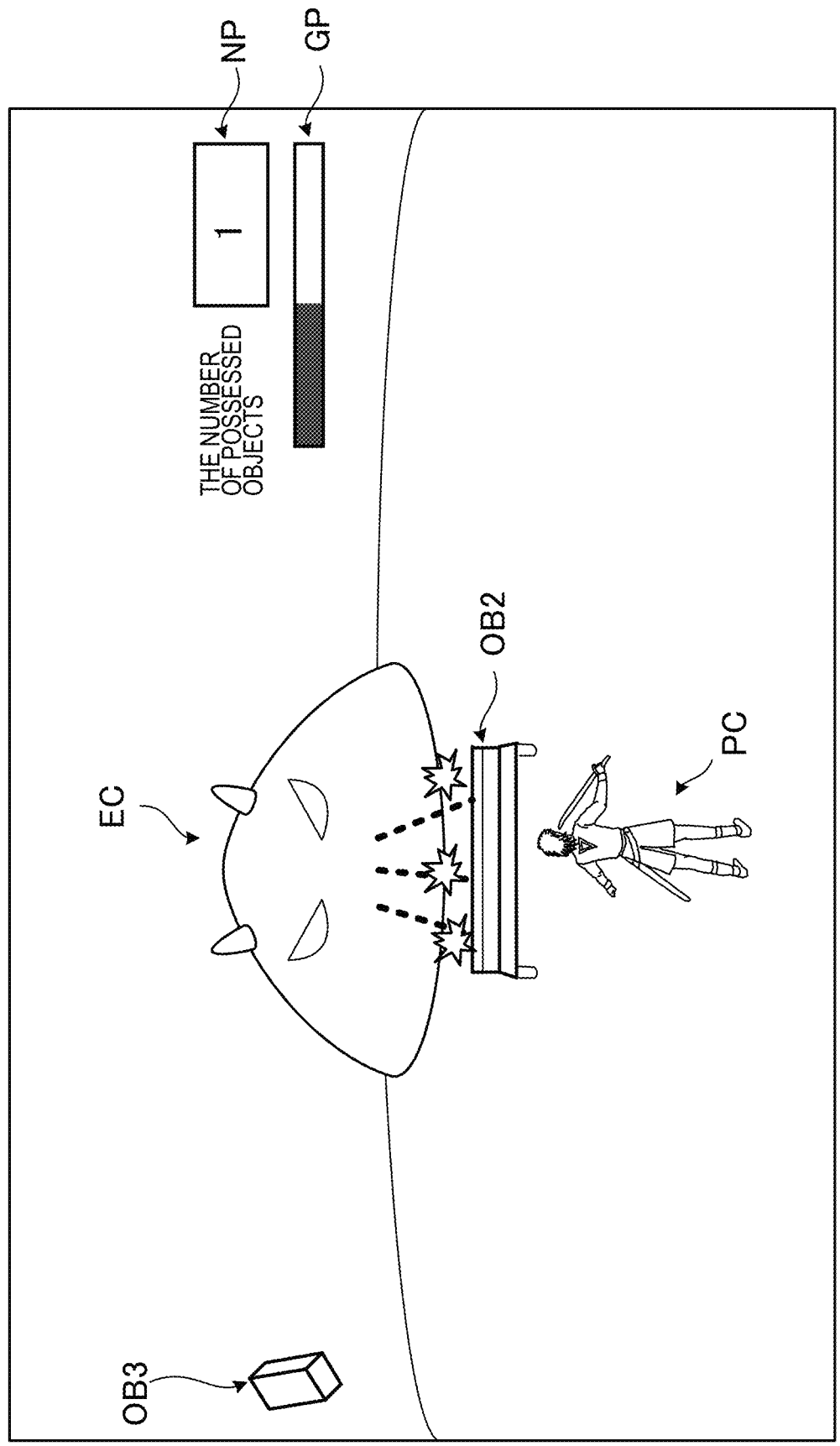
FIG. 12 is a diagram showing an example of the game image of the first embodiment.

For example, as illustrated in FIG. 12, when the operation instruction E4 of "protection" is received, the operation controller 112a releases the holding state of the object OB2 of the bench set in the holding state, and causes the object OB2 of the bench to perform an operation of preventing an attack from the enemy character EC using the object OB2 of the bench as a shield. When there is a plurality of enemy characters, the operation controller 112a causes the object OB2 of the bench to perform an operation to prevent an attack from the plurality of enemy character closest to the player character PC. The operation to protect is, for example, an operation to arrange the object OB2 of the bench so as to form a wall between the player character PC and the enemy character EC.

When, for example, the player character PC is damaged by an attack of an enemy character, the operation controller 112a subtracts the damage value from the power value (HP value) of the player character PC. When the protection of the object OB2 is achieved, the operation controller 112a subtracts the defensive power parameter (protection value) corresponding to the protection of the object OB2 from the damage value. The operation controller 112a may control such that the heavier the object, the higher defensive power parameter.

2.4.3. Special Object Operation

The operation controller 112a preset the operation contents of special objects. In other words, the operation controller 112a may preset the operation contents of the object for each object. For example, for the object of the gun, the game device 10 stores the operation contents in which the bullet is fired as the object to be constantly attacked in the storage 170 in advance. The operation controller 112a releases the holding state of the object of the gun set in the holding state when an operation instruction of the object of the gun is received, and controls the object of the gun so that a bullet is fired to the enemy character EC to be locked on, for example.

Figure 13:
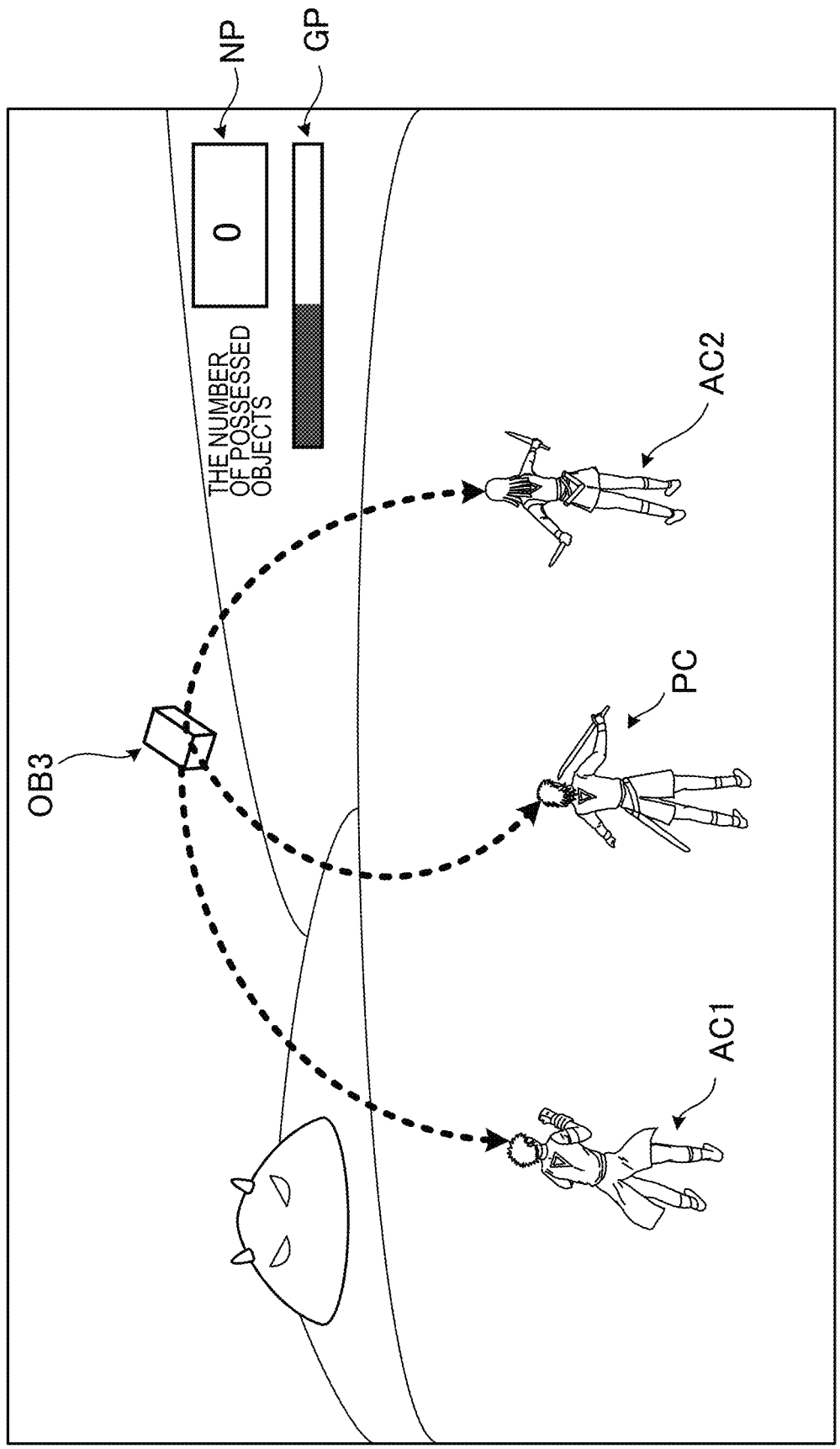
FIG. 13 is a diagram showing an example of the game image of the first embodiment.

The game device 10 stores in advance in the storage 170 an operation content of the object of the shield to be arranged to form a wall as an object to always protect. When an operation instruction of the object of the shield is received, the operation controller 112a releases the holding state of the object of the shield set in the holding state. For example, the operation controller 112a controls the object of the shield so that the object of the shield is arranged as a wall between the player character PC and the enemy character EC, and protect the player character PC against the attack from the enemy character EC. The game device 10 stores in advance an operation contents in which a drug is distributed to the character(s) as an object for always recovering a drug object in the storage 170. When the motion instruction of the object of the drug is received as shown in FIG. 13, the operation controller 112a releases the holding state of the object OB3 of the drug set in the holding state, and executes the operation of the object of the drug so that the drug is distributed to the player character PC and the member characters AC1 and AC2, for example. The game device 10 controls for increasing in the power value (HP value) of the player character PC and the member characters AC1 and AC2 based on a recovery force parameter (recovery value, an increase rate, and an addition value) corresponding to the drug object OB3.

2.4.4. Separate Operation Control of a Plurality of Objects

When the operation instruction is received from the player, the operation controller 112a may individually cancel the holding state of the plurality of objects set in the holding state, and cause the object to perform the predetermined operation.

For example, the game device 10 releases the holding state of the object in ascending order of the identification number of the object in the holding state stored in the storage 170. In other words, by the FIFO (first in, first out) method, the operation starts from the old object. For example, as shown in FIG. 10B, when a predetermined operation instruction is received, the game device 10 releases the holding state of the object OB1 of the bicycle, the first object, set in the holding state, and the object OB1 of the bicycle performs the predetermined operation based on the operation contents corresponding to the predetermined operation instruction. Next, the object OB2 of the bench, the second object, set in the holding state is arranged at Q1 above the player character PC (which may be almost overhead; the same shall apply hereinafter). Thereafter, when the predetermined operation instruction is received, the holding state of the object OB2 of the bench is released, and the object OB2 of the bench performs the predetermined operation based on the operation contents corresponding to the predetermined operation instruction. Then, the object OB3 of the drug, the third object, set in the holding state is arranged at the position Q1 above the player character PC. Thereafter, when a predetermined operation instruction is received, the holding state of the drug object OB3 is released, and the drug object OB3 performs a predetermined operation based on the operation contents corresponding to the operation instruction.

By controlling in this way, the player can recognize the object to be operated as an object that will next operate the object in the holding state above the player character PC. Therefore, the object to be operated can be easily recognized, and an appropriate operation instruction can be given to the object.

2.4.5. Integrated Operation Control of the Plurality of Objects

When the operation instruction is received from the player, the operation controller 112a may release the holding state of a plurality of objects set in the holding state collectively, and cause the object to perform a predetermined operation.

First, the receiver 110 receives the designation instruction of a plurality of objects and further receives the operation instruction of the plurality of objects designated. When the designation instruction and the operation instruction of a plurality of objects are received, the operation controller 112a releases the holding state of the plurality of objects and, for example, operates the plurality of objects based on the operation contents corresponding to the received operation instruction for the enemy character EC to be locked on.

For example, when the designation instruction of the object OB1 of the bicycle in the holding state and the object OB2 of the bench in the holding state, and the operation instruction E1 of the "near attack" are received, the operation controller 112a releases the holding state of the object OB1 of the bicycle and the object OB2 of the bench. After that, for example, the operation controller 112a causes the object OB1 of the bicycle and the object OB2 of the bench to execute the operation of the near attack so that the object OB1 of the bicycle and the object OB2 of the bench collide at a close distance with the enemy character EC to be locked on.

When the designation instruction of the object OB7 of the vending machine in the holding state, the object OB8 of the refrigerator in the holding state, and the operation instruction E4 of the defense are received, the operation controller 112a releases the holding state of the object OB7 of the vending machine and the object OB8 of the refrigerator. After that, for example, the operation controller 112a causes the object OB7 of the vending machine and the object OB8 of the refrigerator to execute an operation to prevent an attack from the enemy character EC, using the object OB7 of the vending machine and the object OB8 of the refrigerator as a shield.

The operation controller 112a may change the number of objects to be operated collectively in accordance with the predetermined parameters (for example, a capability value) of the player character PC.

For example, the operation controller 112a controls such that the higher the capability value of the player character, the greater the number of objects to be operated collectively.

For example, the operation controller 112a increases the number M of the objects to be operated collectively in proportion to the capability value ABP of the player character. Specifically, when the capability value ABP of the player character PC is 10, the operation controller 112a sets the number of the objects to be operated to 10 collectively, and when the capability value ABP of the player character PC is 60, the number of objects to be collectively operated is set to 60. As described above, as the player character PC grows, the number of objects to be collectively operated increases. Therefore, the player P can play the game while enjoying the growth of the player character PC.

2.4.6. Processing to Change the Operation of the Object in Accordance with the Predetermined Parameters of the Player Character The operation controller 112a may change the operation of the object in accordance with the predetermined parameters (for example, a capability value) of the player character PC. By controlling in this way, the player P can play the game while enjoying the growth of the player character PC.

For example, the operation controller 112a causes the player character PC having a high capability value to execute attacks having a high offensive power. For example, the operation controller 112a multiplies a predetermined coefficient AK (1<=AK) proportional to a capability value by offensive power parameter. Further, the operation controller 112a performs protection with high protection power for the player character PC having a high capability value. For example, the operation controller 112a multiplies a predetermined coefficient AK (1<=AK) proportional to a capability value by a defensive power parameter. Further, the operation controller 112a performs protection with high recovery power for the player character PC having a high capability value. For example, the operation controller 112a multiplies a predetermined coefficient AK (1<=AK) proportional to a capability value by a recovery force parameter.

2.4.7. Timing of the Operation

The operation controller 112a releases the holding state of the object set to be in the holding state at the timing when the operation instruction is received from the player, and performs the predetermined operation for the object.

The player can play the game with operation instructions, intuitively. The operation controller 112a may releases the holding state of the object set in the holding state at predetermined timing determined by the game device 10, and execute a predetermined operation of the object, as follows. In other words, an operation instruction may be given by the CPU (computer) at predetermined timing determined by the game device 10, and the operation controller 112a may releases the holding state, and execute the predetermined operation for the object in the holding state.

The operation controller 112a sets the timing T2 at which a predetermined period (for example, 60 seconds), which starts from the timing T1 at which the object is ensured as an object in the holding state, is elapsed. At the timing T2, the operation controller 112a releases the holding state of the object set in the holding state, and performs a predetermined operation for the object. The operation controller 112a can perform the predetermined operation of the object at timing T2 appropriate to the game progress.

The operation controller 112a sets the timing in which the predetermined condition is satisfied as the predetermined timing, regarding the object in the holding state, releases the holding state of the object set in the holding state at the predetermined timing, and performs a predetermined operation for the object.

For example, when there is one object configured by combining the object OB21 and the object OB22, it is a predetermined condition that both the object OB21 and the object OB22 are set as the object in the holding state. In other words, the operation controller 112a sets the timing T3 at which both of the object OB21 and the object OB22 are set as the object in the holding state at predetermined timing, releases the holding state of the objects OB21 and OB22 in the holding state, and performs predetermined operations of the objects OB21 and OB22. The operation controller 112a may operate in the state in which the objects OB21 and OB22 are combined.

Further, when "a condition in which the number of objects in the holding state reaches a predetermined number (for example, five) is a predetermined condition," the operation controller 112a may set the timing T4 at which the number of objects in the holding state reaches a predetermined number (for example, five), as predetermined timing, release the holding state of the object in the holding state, and perform the predetermined operations of the five objects.

When a special object (e.g., an object of the artillery) is secured as the object in the holding state, and maintained the holding state, and when an instruction of an enemy character of the target (to be locked on) and an instruction of the attack preparation period are received, the game device 10 may also release the holding state of a special object at T5 at the end of the preparation period, or at the timing T6, at which the predetermined condition is satisfied, and perform a predetermined operation (an operation of firing the artillery to the enemy character) of the special object.

2.4.8. Operating the Parameters

The game device 10 improves the entertainment of the game by setting an operating parameter corresponding to a player character PC beforehand. Here, the operation parameter (also referred to as the "psychic powers' parameters") increases when the enemy character EC is defeated or when the game stage is cleared. The operating parameters may increase over time. On the other hand, the operating parameters are reduced when the object in the holding state is operated.

In other words, the operation controller 112a releases the holding state of the object in the holding state and performs a predetermined operation of the object on the condition that a predetermined consumption value is subtracted from the operation parameter.

For example, as shown in FIG. 9, the game device 10 preset the consumption value for each object.
For example, when the current operating parameter of the player character PC is "100" and the consumption value of the object (the total value of the consumption value in the case of a plurality of objects) is 100 or less, the operation controller 112a can release the holding state of the object and can perform the predetermined operation of the object.

For example, when the consumption value of the object OB1 of a bicycle is 60, and the holding state of the object OB1 of the bicycle is released, and a predetermined operation is performed for the object OB1 of the bicycle, the operation controller 112a updates the operation parameter to "40" by subtracting the consumption value "60" of the object OB1 from the operation parameter "100" of the player character PC. Subsequently, the operation controller 112a releases the holding state of the object OB1 of the bicycle, and causes the object OB1 of the bicycle to perform a predetermined operation.

The display controller 118 displays a gauge GP representing the "current operating parameter (e.g., 100)"/"upper limit value (e.g., 200) of the current operating parameter" and the current operating parameter as shown in FIG. 5 to control the player so that the player can recognize the value of the operating parameter.

The game device 10 increases the upper limit value of the operation parameter in accordance with the capacity value of the player character PC. The game device 10 may control for increasing the operating parameter above the upper limit value.

2.5. Flow Chart

Figure 14:
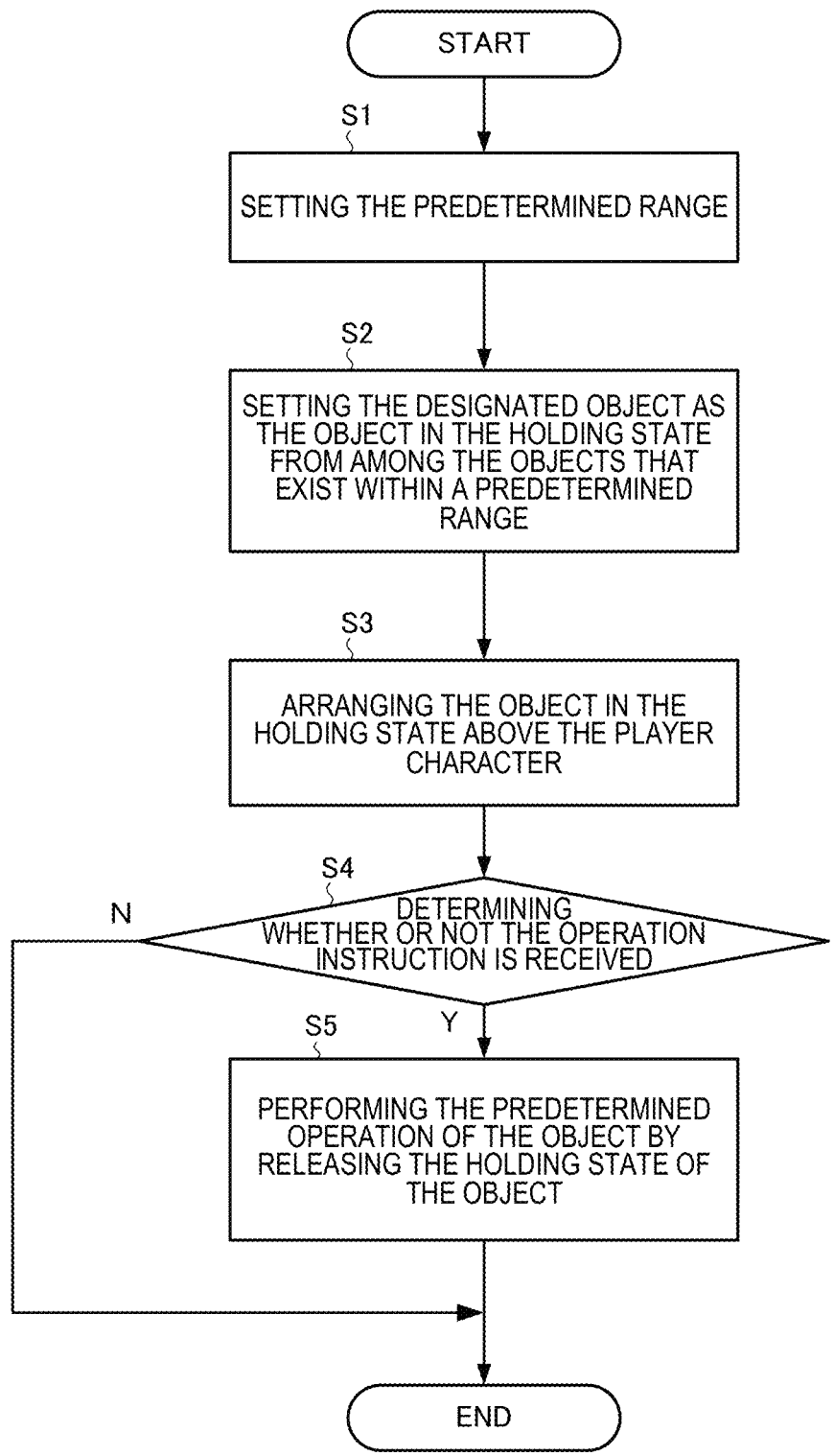
FIG. 14 is a flowchart illustrating a processing flow of the first embodiment.

Next, an example of a processing flow executed by the game device 10 will be described with reference to FIG. 14.

First, in Step S1, the range setting processor 116 performs a process of setting the predetermined range. In other words, the range setting processor 116 sets the predetermined range AR during the period T when the range setting input information for setting the predetermined range AR is received from the operation input unit 150 by the receiver 110.

In Step S2, the holding controller 115 sets the designated object as the object in the holding state from among the objects that exist within a predetermined range. For example, the hold controller 115 sets the object OB1 designated by the computer (CPU) as an object in the holding state from among the objects existing within the predetermined range AR. In Step S3, the holding controller 115 arranges the object in the holding state above the player character.

In Step S4, the operation controller 112a determines whether or not the operation instruction is received. In Step S5, when the operation instruction is received (Y in Step S4), the operation controller 112a releases the holding state of the object and performs the predetermined operation of the object. For example, when the operation instruction E1 of the "near-range attack" by the player P is received, the operation controller 112a releases the holding state of the bicycle object OB1 in the holding state, and causes the enemy character EC that is the target of the attack to perform the operation of the near-range attack of the bicycle object OB1. The process is performed in this way.

3. The Application Example 3.1. The Method of the Application of Setting the Object as the Object in Holding State The hold controller 115 of the game device 10 sets a given object from among the objects existing in the game space as an object in the holding state, but may set the object designated based on the player's instruction operation (operation input) as the object in the holding state, regardless of the presence or absence of the predetermined range AR.

Figure 15:
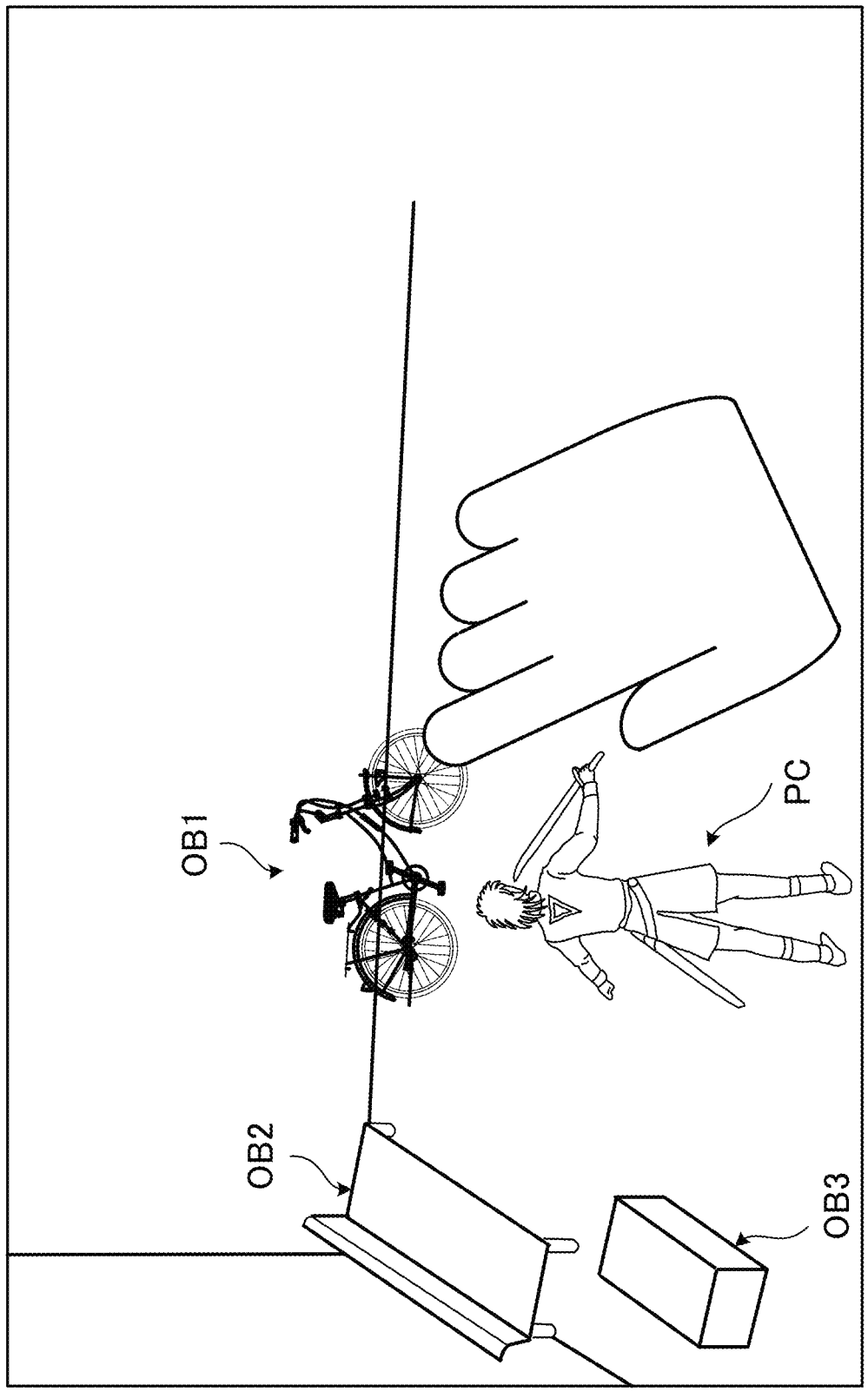
FIG. 15 is an explanatory diagram illustrating the designation of an object of the first embodiment.

For example, as shown in FIG. 15, the receiver 110 may receive the designation of the object OB1 of the bicycle based on the player's touch operation, and the holding controller 115 may set the object OB1 of the bicycle as the object in the holding state. More specifically, when a touch operation of the player is detected in the display area of the object OB1 of the bicycle, the holding controller 115 may set the object OB1 of the bicycle as the object in the holding state.

When the predetermined range AR is set, the holding controller 115 may set the object designated by the touch operation of the player as the object in the holding state from among the objects existing within the predetermined range AR.

3.2. Example Applications for the Objects in the Holding Status

The holding controller 115 may set the designated object from among the objects arranged in the game space as the object in the holding object, and control for displaying information regarding the object in the holding state at a predetermined position on the game image.

Here, "information regarding the object in the holding state" means the type, number, etc. of the object in the holding state.

For example, the holding controller 115 may display an icon of an object in the holding state that is ensured by the player character PC in a predefined area WA of the game image. An icon is a symbol, mark, or indicator of an object. The holding controller 115 displays an icon corresponding to the type of object.

Figure 16:
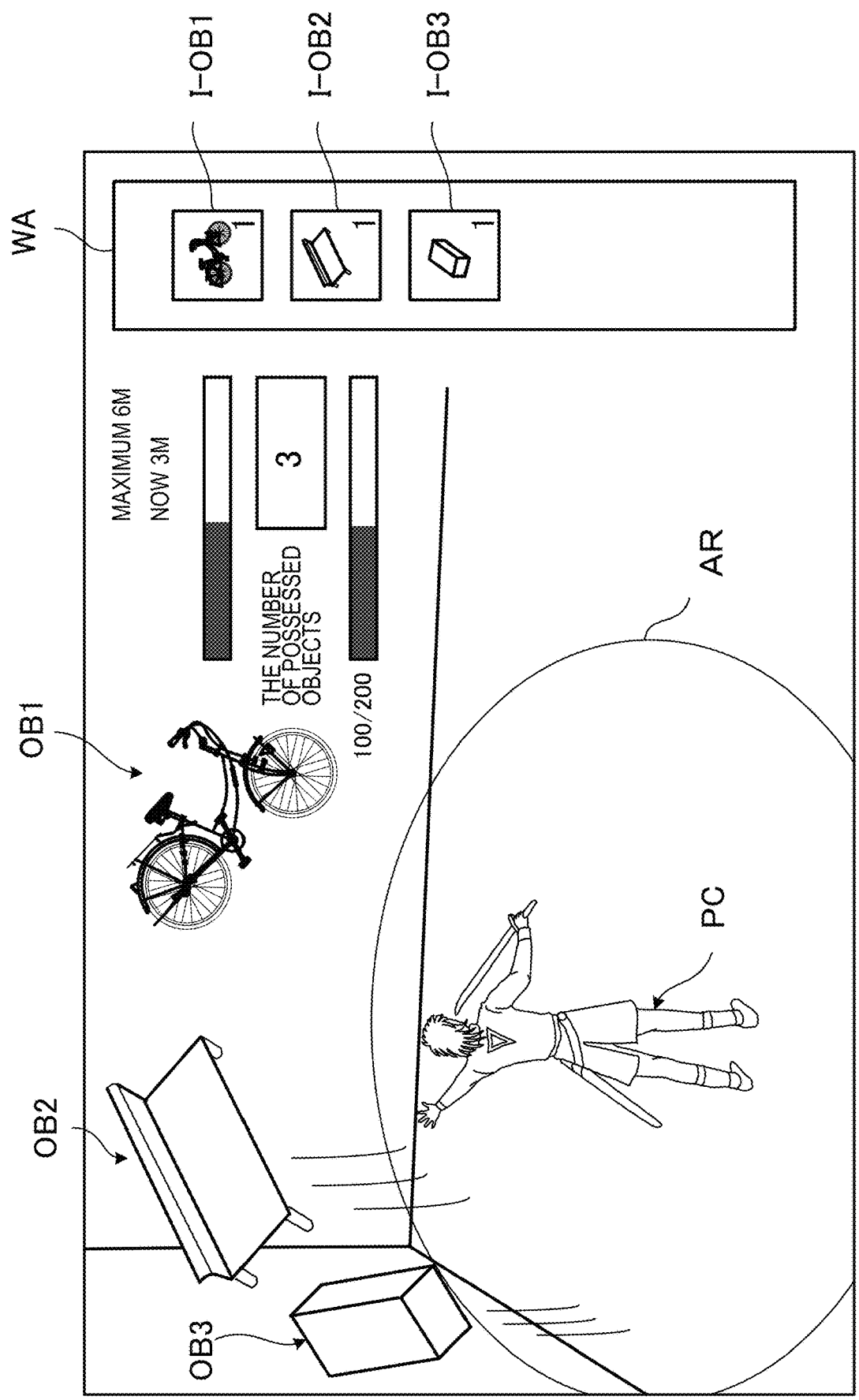
FIG. 16 is a diagram illustrating an example of displaying information concerning an object in the holding state of the first embodiment.

In other words, as shown in FIG. 16, the holding controller 115 displays the icon I-OB1 corresponding to the object OB1 of the bicycle in the holding state, the icon I-OB2 corresponding to the object OB2 of the bench in the holding state, and the icon I-OB3 corresponding to the object OB3 of the drug in the holding state at the predetermined position of a predetermined area (display area) WA. In the editing image, the game device 10 may control the display order of the icons corresponding to the objects in the holding state for editing based on the operation input of the player.

The holding controller 115 displays the number of objects in the holding state that the player character PC has, for each object (for each object type). For example, when the number of objects OB1 of the bicycle in the holding state is "1," the hold controller 115 displays "1" in the lower right of the icon I-OB1. Similarly, when the number of objects OB2 of the bench in the holding state and the number of objects OB3 of the drug in the holding state are respectively "1," the holding controller 115 displays "1" in the lower right of each of the icons I-0B2 and I-0B3. By controlling in this way, the player can accurately know the number of each object that the player character PC has. For example, when the object in the holding state is out of view from the point of view of the camera, the player can recognize the number of objects in the holding state.

Figure 17:
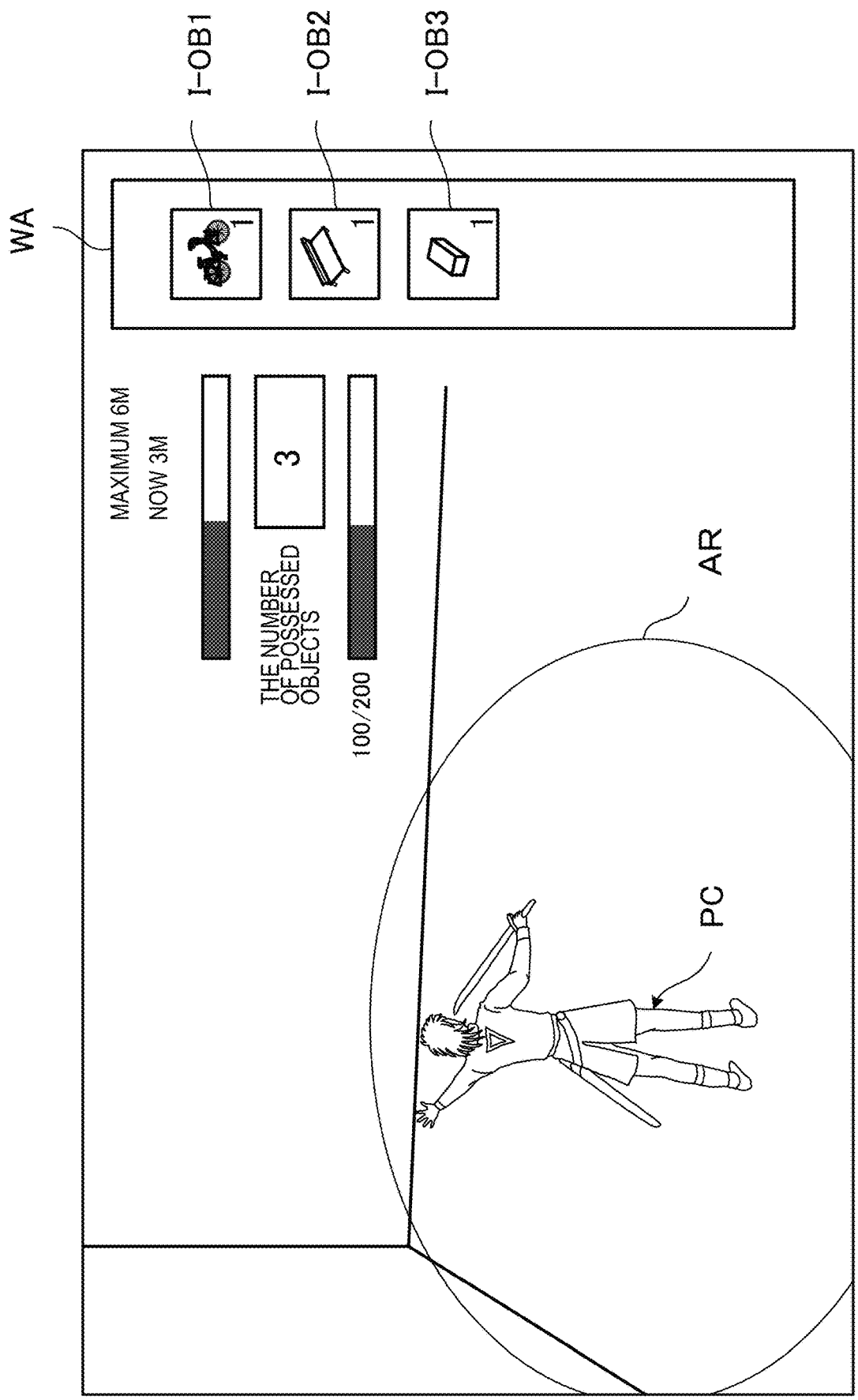
FIG. 17 is a diagram illustrating an example of displaying information concerning an object in the holding state of the first embodiment.

In addition, when the game device 10 controls for displaying information regarding the object in the holding state at the predetermined region WA, the game device 10 may control not to arrange the object in the holding state in the game space, as shown in FIG. 17. In other words, the game device 10 may temporarily delete the object in the holding state from the game space when the designated object from among the objects existing in the game space is set as object in the holding state object. The player can recognize which object is in the holding state by checking the information regarding the object displayed in the predefined area WA. When the object in the holding state that has been temporarily deleted is released from the holding state, and is operated, the game device 10 controls the object so as to reappear in the game space, and perform a predetermined operation of the object that has appeared.

Since the predetermined area WA is limited, when the number of icons is large, the layout of the icons may be controlled in a modifiable manner by arranging the icons in a reel-like (loop-like) shape and moving the reel by flick operation. For example, the game device 10 controls for displaying a new icon when a touch input to the upper end of the reel or a touch input to the lower end of the reel is detected.

The game device 10 may control to operate the plurality of objects by mash the same icon. For example, when there are 10 objects OB1 of bicycles in the holding state, and five consecutive hits (five touch inputs) are received for the icon I-OB1 corresponding to the bicycle's object OB1, the game device 10 may control for performing the predetermined operation of the object OB1 of the five bicycles. During touch input to the same icon (until touch-off), the game device 10 may detects mashing the same icon automatically, and control a predetermined operation of the plurality of objects continuously until the number is 0.

The game device 10 may receive the selection of the plurality of objects by slide input to the plurality of different icons, and control for performing the predetermined operations of the plurality of objects. For example, when there is one object OB1 of the bicycle in a holding state, one object OB2 of the bench in a holding state, and one object OB3 of the drug in the holding state, and when the slide input is received for the icon I-OB1 corresponding to the object OB1 of the bicycle, the icon I-OB2 corresponding to the object OB2 of the bench, and the icon I-OB3 corresponding to the object OB3 of the drug, the game device 10 may control the object OB1 of the bicycle, the object OB2 of the bench, and the object OB3 of the drug so that a predetermined operation be continuously performed.

The game device 10 may continuously accept the selection of the plurality of objects during the slide input (until touch-off).

The game device 10 may also display the mark of the bomb and accept the selection of the plurality of objects during the slide input (until touch-off), and cause the selected plurality of objects to explode when the slide operation is touch-off from the display portion of the mark of the bomb (the display area of the mark of the explosion). When the selection in a predetermined area WA unit (reel unit) is received and the slide operation is touched off at the display portion of the explosion mark, the game device 10 may sift to perform the exploding operation of all objects in the holding state. The game device 10 may change the type of the explosion mark, the offensive power (power), and the number of units according to the capability value of the player and the possession skill.

When the flick input is received from the predetermined area WA toward the outside of the screen of the display, the game device 10 may erase the predetermined area WA (or display a storage bar corresponding to the predetermined area WA). When the flick input is received from the screen end toward the inside, the game device 10 may be controlled to display the predetermined area WA again.

3.3. Reduction of the Predetermined Range

The range setting processor 116 may control the predetermined range AR for not only expanding but also reducing the predetermined range AR. For example, when the player character PC is damaged by an attack from the enemy character EC, the range setting processor 116 may control for reducing the predetermined range AR. For example, when the radius of the predetermined range AR is 6 m and the player character PC is attacked by the enemy character EC, the range setting processor 116 reduces the radius of the predetermined range AR to 3 m (50% reduction) until finishing a predetermined period (60 seconds) from the timing when the player character PC is attacked by the enemy character EC. For example, when the player character PC is damaged by the attack from the enemy character EC, the range setting processor 116 may controls for reducing the maximum expansion range of the predetermined range AR.

3.4. Deceleration of Expansion Speed within the Specified Range

The range setting processor 116 may control for slowing down the expansion speed of the predetermined range AR when the player character PC is damaged by the attack from the enemy character EC. For example, when the expansion speed V of the predetermined range AR is 6 m/s, and the player character PC is attacked by the enemy character EC, the range setting processor 116 sets the expansion speed V to 3 m/s until finishing a predetermined period (60 seconds) from the timing when the player character PC is attacked by the enemy character EC.

3.5. Selecting Object in the Holding Status

When releasing the holding state of the plurality of objects in the holding state individually and causing the object to perform a predetermined operation, the operation controller 112a operates the object from the older object using the FIFO (first-in, first out) manner. However, the operation controller 112a may release the holding state of the object selected based on the player's instruction, and cause the object to perform the predetermined operation.

For example, as shown in FIG. 10B, when the object OB1 of the bicycle in the first holding state is arranged at the position Q1 above the player character PC and the player P wants to cause the object OB2 of the bench rather than the object OB1 of the bicycle to perform a predetermined operation, the operation controller 112a moves the object OB3 from the object OB1 according to the trajectory L, and arranges the object OB2 of the bench at the position Q1 above the player character PC. The operation controller 112a releases the holding state of the object OB2 of the bench based on the motion instruction, and causes the object OB2 to perform predetermined operations based on the operation contents corresponding to the motion instruction. The trajectory when the object moves may or may not be displayed on the game image.

Figure 18:
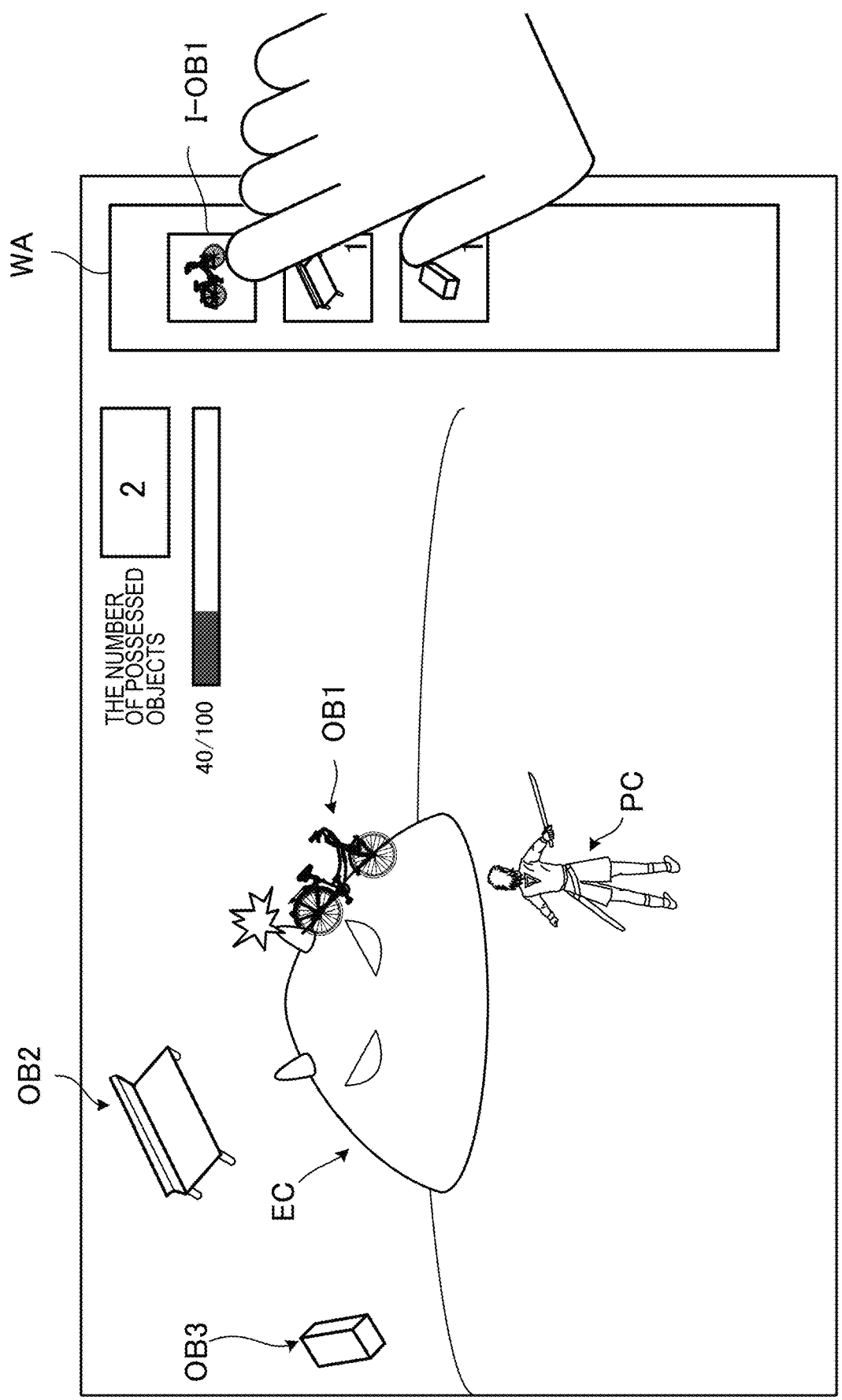
FIG. 18 is an explanatory diagram illustrating an operation instruction of the first embodiment.

As shown in FIG. 18, when receiving the selection instruction (touch operation) of the icon I-OB1 of the bicycle object OB1 in the holding state, the operation controller 112a may release the holding state of the selected object OB1 of the bicycle, and perform the predetermined operation of the object OB1.

3.6. Special Move

When the special move is invoked based on the operation of the player, the game device 10 may set a specific period (for example, 60 seconds).

The game device 10 can move the enemy character EC, which exists more than a predetermined distance (for example, 20 m or more) from the player character PC, near the player character PC during the specific period. For example, the game device 10 moves the enemy character EC existing in a position that is not capable of long-range attack near the player character PC. When having the configuration for the calling instruction for moving the enemy character EC within a predetermined range AR, and receiving the calling instruction, the game device 10 may move the enemy character EC within a predetermined range AR during the specific period.

The game device 10 further expands the predetermined range AR (e.g., 1.5 times) during the specific period, and sets an unlimited number of objects that can be set in the holding state. Also, the game device 10 is able to set the holding state to all of the objects without the weight during the specified period. By controlling in this way, the enemy character EC can be taken to the vicinity of the player character PC, the heavy object or the large number of objects can be released, and then, the enemy character EC can be attacked. Thus, the enemy character EC can be attacked at once. The game device 10 may also receive instructions for a special attack during the specific period.

For example, the game device 10 may control so that when an instruction of the special attack is received, the object OB is not operated and the enemy character EC is damaged (the body of the enemy character EC is automatically destroyed) by only the psychic powers of the player character PC.

3.7. Special Attacks Against the Enemy Character

The game device 10 may set the enemy character EC1 to be in the holding state, release the holding state of the enemy character EC1 in the holding state, and cause the enemy character EC1 to attack the other enemy character EC2. When the enemy character EC1 is set to be in the holding state, the game device 10 may reduce the power value of the enemy character EC1. By controlling in this way, both the enemy character EC1 and EC2 can be damaged, thereby allowing the player to take advantage of the attack.

3.8. Map Display

The display controller 118 may display the map representing the player character PC, the object in the holding state and the position relationship of the enemy character EC in the game space in a predetermined area of the game image.

3.9. Control of the Period Until the Object is Set in the Holding State.

When the predetermined range AR is set and when the object enters the predetermined range AR, the holding controller 115 may immediately set the object to be in the holding state at the time point TS, or set the object to be in the holding state at the timing point TE when finishing the predetermined period which starts from timing TS when the object enters the predetermined range AR.

In particular, when the predetermined range AR is set, the holding controller 115 may control the predetermined period PR which starts from the timing TS when it is determined that the object (the object for which the holding allowable flag is set to be 1) enters the predetermined range AR, and which finishes at the timing TE when the object is set in the holding state (the timing when the holding state flag is updated from 0 to 1).

<Control of the Predetermined Period by Distance>

The holding controller 115 may control the predetermined period PR according to the distance between the player character and the object.

For example, the holding controller 115 sets the predetermined period PR so that the longer the distance between the position P1 of the player character and the position of the object, the longer the predetermined period PR. In other words, the holding controller 115 controls the predetermined period PR so that the shorter the distance between the position P1 of the player character and the position of the object, the shorter the predetermined period PR.

Specifically, when the distance D between the player character PC and the object OB1 of the bicycle is within 1 m (D<=1), the holding controller 115 sets the predetermined period PR1 for 5 seconds from the timing TS1 when it is determined that the object OB1 of the bicycle enters the predetermined range AR, to the timing when the object OB1 of the bicycle is set in the holding state.

In other words, when the distance D between the player character PC and the bench object OB2 is more than 1 m and less than 5 m (1<D<=5), the holding controller 115 sets the predetermined period PR2 for 10 seconds from the timing TS2 when it is determined that the bench object OB2 enters to the predetermined range AR to the timing TE2 when the bench object OB2 is set in the holding state.

<Control of the Period by Weight>

For example, according to the weight of the object, the holding controller 115 may control the predetermined period PR which starts from the timing TS when it is determined that the object enters the predetermined range AR and which finishes at timing TE when the object is set in the holding state.

For example, as shown in FIG. 9, each object has a predetermined weight. The holding controller 115 sets the predetermined period PR so that the heavier the object is, the longer the predetermined period PR is. In other words, the holding controller 115 controls the predetermined period PR so that the lighter the object, the shorter the predetermined period PR.

Specifically, when the object OB 11 of the nail weighs 0.1 kg, the holding controller 115 sets the predetermined period PR3 for 2 seconds from the timing TS3 when it is determined that the object OB 11 of the nail enters the predetermined range AR to the timing TE3 when the object OB 11 of the nail is set in the holding state.

On the other hand, when the object OB4 of the vehicle having a heavier weight than the nail object OB11, the holding controller 115 sets the predetermined period PR longer than the nail object OB11.

In other words, when the weight of the object OB4 of the vehicle that is heavier than the nail object OB11 is 1600 kg, the holding controller 115 sets the predetermined period PR4 for 10 seconds from the timing TS4 when it is determined that the object OB4 of the vehicle enters to the predetermined range AR to the timing TE4 when the object OB4 of the vehicle is set in the holding state.

<Control of the Period by Distance and Weight>

The holding controller 115 may control the PR from the timing TS when it is determined that the object enters the predetermined range AR to the timing TE when the object is set in the holding state, based on the distance between the player character and the object and the weight of the object.

Specifically, for example, when the distance D between the player character PC and the object OB11 of the nail is within 3 m (D<=3), the holding controller 115 sets the predetermined period PR5, for 2 seconds, from the timing TS5 when it is determined that the object OB11 of the nail enters within the predetermined range AR to the timing TE5 when the object OB11 of the nail is set in the holding state, and sets the predetermined period PR5 for 4 seconds when the distance D between the player character PC and the object OB11 of the nail is greater than 3 m (3<D<=6) and within 6 m.

In other hands, when the object OB4 of the vehicle has the heavier weight than the nail object OB11, the holding controller 115 sets the predetermined period PR longer than the nail object OB11.

In other words, when the weight of the vehicle's object OB4 is 1600 kg and the distance D between the player character PC and the vehicle's object OB4 is within 3 m (D<=3), the holding controller 115 sets the predetermined period PR6, for 10 seconds, from the timing TS6 when it is determined that the vehicle's object OB4 enters within the predetermined range AR to the timing TE6 when the vehicle's object OB4 is set in the holding state, and when the distance D between the player character PC and the vehicle's object OB4 is greater than 3 m and within 6 m (3<D<=6), the holding controller 115 sets the predetermined period PR6 for 20 seconds.

<Control of the Period Based on the Prescribed Conditions>

When the predetermined range AR is set, the holding controller 115 may control the predetermined period PR from the timing TS when it is determined that the object (the object for which the holding allowable flag is set to be 1) enters the predetermined range AR to the timing TE when the object is set in the holding state based on the predetermined conditions.

For example, the holding controller 115 may control the predetermined period PR based on the predetermined conditions.

For example, when the distance D between the player character PC and the object is less than 1 m (D<=1), the holding controller 115 sets the predetermined period PR of all the objects to 1 second without the weight. When the distance D between the player character PC and the object is greater than 1 m and less than 2 m (1<D<=2), the holding controller 115 sets the predetermined period PR of the object of less than 2,000 kg for 2 seconds, and does not set the other objects. When the distance D between the player character PC and the object is greater than 2 m and less than 3 m (2<D<=3), the holding controller 115 sets the predetermined period PR of the object of less than 1000 kg for 3 seconds and does not control the predetermined period PR of the other objects. When the distance D between the layer character PC and the object is greater than 3 m and smaller than 4 m (3<D<=4), the holding controller 115 sets the predetermined period PR of the object of less than 100 kg for 4 seconds and does not control the predetermined period PR of the other objects. When the distance D between the player character PC and the object is greater than 4 m and smaller than 5 m (4<D<=5), the holding controller 115 sets the predetermined period PR of the object of less than 10 kg for 5 seconds and does not controls the predetermined period PR of the other objects. When the distance D between the player character PC and the object is greater than 5 m (5<D), the holding controller 115 sets the predetermined period PR of the object of less than 1 kg for 6 seconds and does not control the other objects.

<Other>

When the predetermined range AR is set, the holding controller 115 may control the predetermined period PR from the timing TS when it is determined that the object (the object for which the holding allowable flag is set to be 1) enters the predetermined range AR to the timing TE when the object is set in the holding state, according to the attribution of the object. For example, the holding controller 115 sets the predetermined period PR for the object of the "water" attribution to be 5 seconds, sets the predetermined period PR for the object of the "fire" attribution to be 6 seconds, sets the predetermined period PR for the object of the "tree" attribution to be 7 seconds, sets the predetermined period PR for the object of the "light" attribution to be 8 seconds, and sets the predetermined period PR for the object of the "dark" attribution to be 9 seconds.

When the predetermined range AR is set, the holding controller 115 may control the predetermined period PR from the timing TS when it is determined that the object (the object for which the holding allowable flag is set to be 1) enters the predetermined range AR to the timing TE when the object is set in the holding state, according to the compatibility between the player character and the object.

For example, the holding controller 115 sets the predetermined period PR for 10 seconds for an object having the same attribution as the attribution of the player character, and sets the predetermined period PR for 20 seconds for an object having an attribution different from the attribution of the player character.

The holding controller 115 sets the predetermined period PR for 10 seconds when a type of object is compatible with a type of the player character, and sets the predetermined period PR for 20 seconds when the type of object is incompatible with the type of the player character.

<Adjustment According to Growth of Player Character>

The holding controller 115 may further adjust the period PR (the period PR from the timing TS when it is determined that the object enters the predetermined range AR until the timing TE when the object is set in the holding state) according to the growth of the player character PC. For example, the holding controller 115 may set a coefficient X (0<X<1) so that the higher the capability value of the player character PC increases, the lower the coefficient X decreases, multiply the above-described period PR by the coefficient X, and use the value after multiplication as the period PR.

3.10. Counter-Attack

The game device 10 may use the object intercept attack technique. For example, when the enemy character EC has thrown the given object OB 20 against the player character PC, and when the player or CPU (computer) receives the operation instruction of the intercept, the player character PC may repel the object OB 20 like a counter.

3.11. Application of the Game System 3.11.1. Application of Server 20

The server 20 may perform some or all of the processing performed by the game device 10. For example, the processor 200 of the server 20 may function as receiver 210, arrangement processor 211, movement/motion processor 212, operation controller 212a, holding controller 215, a game processor 214, range setting processor 216, display controller 218, image generator 208, and sound controller 209.

The communication controller 201 transmits information on the game, information on the generated image, and sound control information to the game device 10. The communication controller 201 receives input information (for example, information regarding various instructions such as an operation instruction) received from the game device 10.

The receiver 210 receives input information (for example, information regarding various instructions such as an operation instruction) of the game device 10. Since the specific processing of the arrangement processor 211 of the server 20 is the same as that of the arrangement processor 111 of the game device 10, the description thereof will not be repeated.

Since the specific processing of the movement/motion processor 212 of the server 20 is the same as that of the movement/motion processor 112 of the game device 10, the description thereof will not be repeated.

When the predetermined conditions are satisfied, the operation controller 212a of the server 20 releases the holding state of the object set in the holding state by the holding controller 215, and causes the object to perform the predetermined operation. Since the specific processing of the operation controller 212a is the same as that of the operation controller 112a of the game device 10, the description thereof will not be repeated.

The hold controller 215 of the server 20 sets a designated object from among the objects arranged in the game space, as the holding state object, performs control for arranging the object in the holding state at a predetermined position in the game space, and/or performs control for displaying information regarding the object in the holding state at a predetermined position on the game image. The "control for displaying" means that the server 20 controls the display on the game image in the game device (terminal device) 10. For example, when the server 20 generates "control information" for displaying information regarding the object in the holding state at a predetermined position on the game image, and transmits the information to the game device 10, the game device 10 displays information regarding the object in the holding state at a predetermined position on the game image based on the "control information" when the "control information" is received from the server 20. The specific processing of the holding controller 215 is performed in the same manner as that of the holding controller 115 of the game device 10, and the description thereof will not be repeated.

Since the specific processing of the range setting processor 216 of the server 20 is the same as that of the range setting processor 116 of the game device 10, the description thereof will not be repeated.

The display controller 218 of the server 20 controls the display 190 of the game device 10 to display the image and information regarding the image generated by the image generating section 208. Since the specific processing is the same as that of the display controller 218 of the game device 10, the description thereof will not be repeated. The "control for displaying" means that the server 20 controls the display on the game image in the game device (terminal device) 10. For example, when the server 20 generates "control information" to be displayed on the game image of the game device 10, and transmits it to the game device 10, the game device 10 displays the game image based on the "control information" when the "control information" is received from the server 20.

Since the specific processing of the image generator 208 of the server 20 is the same as that of the image generator 120 of the game device 10, the description thereof will not be repeated.

Since the specific processing of the sound controller 209 of the server 20 is the same as that of the sound controller 130 of the game device 10, the description thereof will not be repeated.

3.11.2 Example of the Browser Game

The game device 10 may perform a game program in a browser (browser software, web browser).

In other words, the server 20 may provide game services the game device having the web browser for the player playing the browser games (games that start only by opening an installation site in a web browser) made in a variety of languages, such as HTML, FLASH, CGI, PHP, shockwave and Java™ applets, and JavaScript™). In addition, when the browser game is performed by the game device 10, the game device 10 includes a web browser capable of viewing web pages (data in HTML format).

In other words, the game device 10 includes a communication control function for communicating with the server 20 and a web browser function for performing display control using data received from the server 20 (web data, data created in an HTML format, or the like) and transmitting data of a player operation to the server 20. Specifically, when performing the game program provided from the server 20, the game device 10 requests the server 20 to start the game, performs data transmission and reception with the server 20, and starts the game.

The server 20 receives input information and game information based on the operation of the player of the game device 10 (i.e., a player who executes a game), and performs game processing based on the received information.

The server 20 transmits the game processing result and the game control information to the game device 10.

The game device 10 performs game processing based on the game processing result and the game control information received from the server 20.

The game device 10 acquires the game information regarding the player and the game information regarding other players from the server 20 and performs game processing based on the game program stored in the storage area of the game device 10.

4. Second Embodiment

In the first embodiment, when the designated object from among the objects arranged in the game space is set as the object in the holding state and the predetermined conditions are satisfied for the object in the holding state (for example, when the operation instruction is received or when the operation instruction is given by the CPU), an example in which the holding state of the object is released and the predetermined operation of the object is performed is described, but is not limited thereto. Hereinafter, an example will be described in which the period until a predetermined operation is performed for the object is controlled according to the weight of the object or the type of object (for example, a car, a refrigerator, a balloon, a fixture, an adhesive, etc.). The game system of the second embodiment is similar to the game system 1 (see the item of FIG. 1) configured of the first embodiment, and the server 20 and the game device 10 are configured to be connected via a network.

The type of the object of the second embodiment may be a physical things, such as a car, a refrigerator, a balloon, and a nail; physical things, which are classified according to the characteristics or conditions of the object, such as fixtures and adhesives; physical things, which are classified according to the material of the object, such as metal or wood; or physical things, which are classified according to the attributions of the object (such as "wood," "water," "fire," etc.).

In the following description, the matters that are common with the first embodiment in the second embodiment will not be described, and the matters that are different from the first embodiment and the matters that should be described in more detail in the second embodiment will be described.

4.1. Configuration of the Game Device of the Second Embodiment

Figure 19:
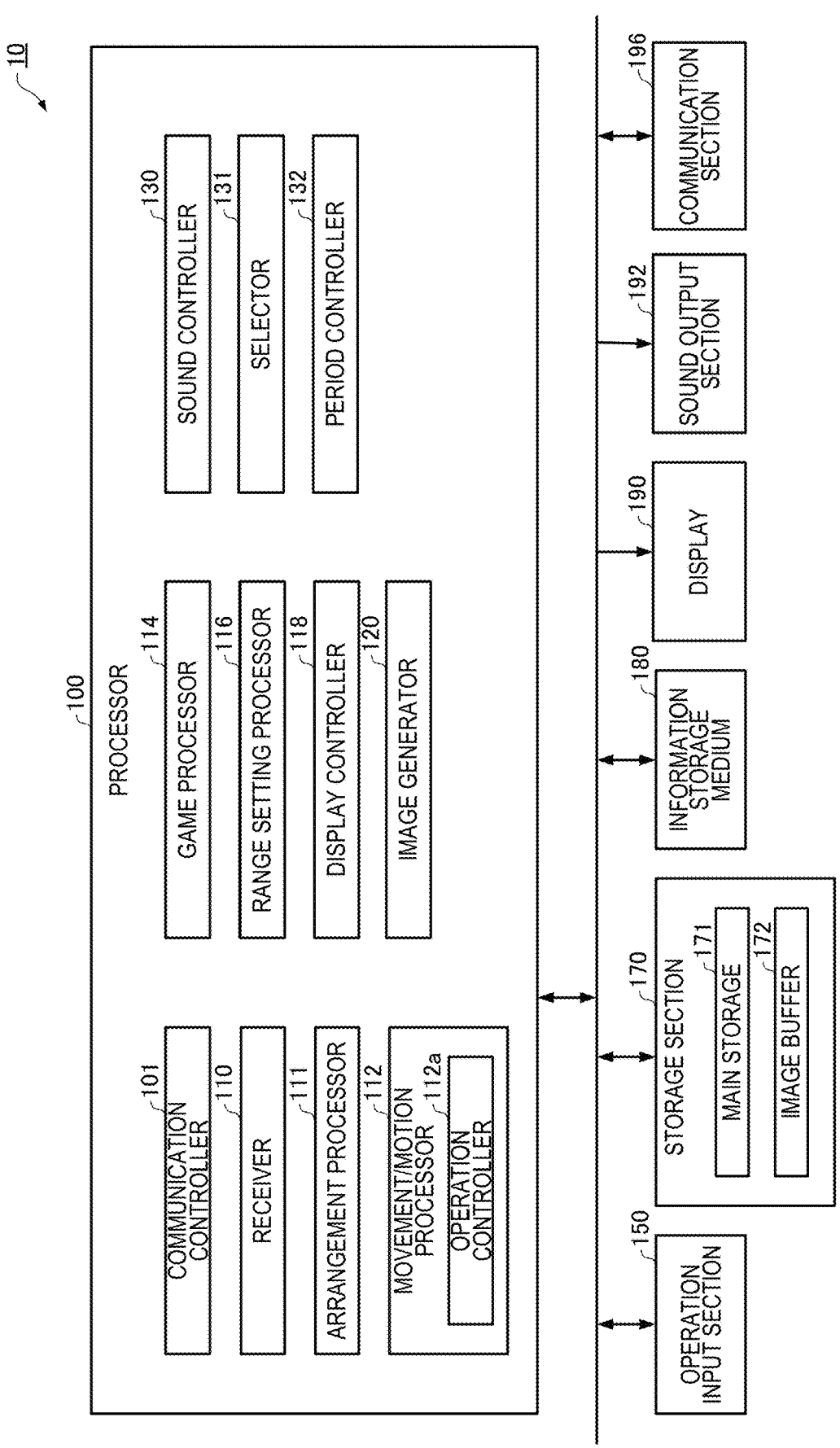
FIG. 19 is a diagram showing an example of a functional block diagram of the game device of the second embodiment.

The configuration of the game device 10 of the second embodiment will be described with reference to FIG. 19. FIG. 19 is an example of a functional block diagram of the game device 10 of the second embodiment. The game device 10 of the second embodiment need not include all of the parts of FIG. 19, and a portion thereof may be omitted.

The processor 100 of the second embodiment functions as a communication controller 101, a receiver 110, an arrangement processor 111, a movement/motion processor 112, a game processor 114, a range setting processor 116, a display controller 118, an image generator 120, a sound controller 130, a selector 131, and a period controller 132.

The motion processor 112 includes an operation controller 112a. The operation controller 112a performs a predetermined operation of the object set in the selected state by the selector 131.

For example, the operation controller 112a performs a predetermined operation of the object in the selected state when the waiting time period, which starts from the specific timing and which corresponds to the object in the selected state, is elapsed. Thus, the operation controller 112a performs a predetermined operation of the object in the selected state at timing (end timing) when the waiting time period has elapsed from the specific timing. More specifically, the operation controller 112a may set the predetermined start timing of an input to the specific timing, and perform the predetermined operation of the object in the selected state when the timing, at which the waiting time period expires, is detected while the predetermined input continues. Thus, the specific timing is start timing of predetermined input, and the operation controller 112a may perform the predetermined operation with respect to the object in the selected state at the timing (end timing) when an elapsed time in which the predetermined input is continuously detected from the specific timing exceeds the waiting time period.

The operation controller 112a may perform predetermined operations of the object in the selected state at the timing when the waiting time period expires, when the waiting time period starts from the specific timing and the each of the waiting time periods corresponds to each of the objects in the selected state. In other words, the operation controller 112a may perform predetermined operation with respect to each of the plurality of the object in the selected state at timing when the predetermined input is detected after the waiting time period of the object in the selected state is elapsed from the specific timing.

The operation controller 112a may change the operation of the object in accordance with predetermined parameters of the player character.

The operation controller 112a may perform the predetermined operation of the object in the selected state on the condition that a predetermined consumption value is subtracted from the operation parameter.

The range setting processor 116 sets the predetermined range in the game space based on the position of the player character. For example, the range setting processor 116 may change the size of a predetermined range with reference to the position of the player character. The range setting processor 116 may change the size of the predetermined range based on the predetermined parameter of the player character. The selector 131 sets the designated object as the object in the selected state from among the objects arranged in the game space.

For example, the selector 131 may set the designated object based on the operation input of the player as the object in the selected state from among the objects existing in the game space. The selector 131 may set the designated object as the object in the selected state from among the objects that exist within a predetermined range. The selector 131 may set a plurality of objects to be in the selected state. The selector 131 may perform control for displaying on the game image the number of objects in the selected state.

The selector 131 may determine whether or not to set the object in the selected state in accordance with at least one of a distance between the player character and the object, a type of object, an attribution of the object, and a compatibility between the player character and the object. The selector 131 may determine whether or not to set the object to be in the selected state based on the type of the player character (character, gender, skill, or the like). The selector 131 may determine whether or not to set the object to be in the selected state based on predetermined parameters (for example, level, capability value, or the like) of the player character. The selector 131 may determine whether or not to set the object to be in the selected state based on the weight of the object.

The selector 131 may change at least one of a number of objects, the attribution, and the type of objects that can be set in the selected state in accordance with predetermined parameters of the player character.

The period controller 132 controls the waiting time period from specific timing until a predetermined operation is performed, corresponding to the object in the selected state. For example, the period controller 132 controls the waiting time period corresponding to the object in the selected state based on at least one of the weight of the object in the selected state and the type of object in the selected state.

Specifically, the period controller 132 may control the waiting time period so that the heavier the weight of the object in the selected state increases, the longer the waiting time period is.

The period controller 132 sets the waiting time period based on at least one of the weight of the object in the selected state and the type of object in the selected state, for each object in the plurality of selected states.

The period controller 132 may set the waiting time period according to the object in the selected state based on at least one of the weight of the object in the selected state and the type of object in the selected state, and a predetermined parameter of the player character.

When a player character has a special item, the operation controller 112a may lift up the object heavier than a predetermined value (for example, 1000 kg), and control the object so that it can be fired toward the enemy character. The period controller 132 may control for shortening the waiting time period (for example, the waiting time period is halved) when a player character has the special item.

4.2. Configuration of the Server of the Second Embodiment

Since the configuration of the server 20 of the second embodiment is the same as that of the first embodiment shown in FIG. 3, the description thereof will not be repeated.

4.3. Overview of the Second Embodiment

Next, the method of the second embodiment will be described. The game device 10 of the second embodiment applies the first embodiment.

The game device 10 of the second embodiment reproduces the difficulty in the operation of the object and controls the waiting time period until, for example, the object is lifted and launched toward the enemy character.

Figure 20:
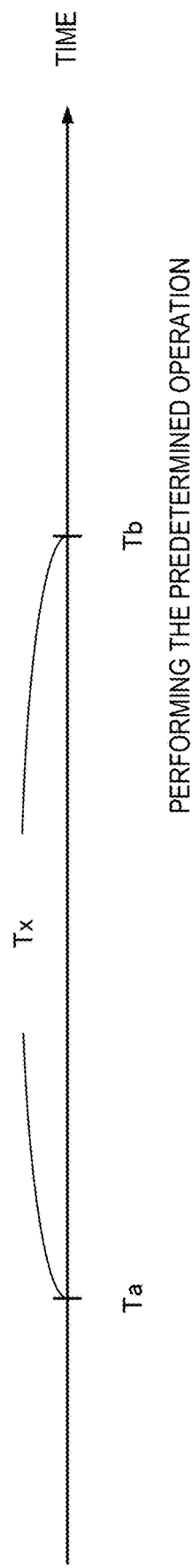
FIG. 20 is an explanatory diagram illustrating an operation timing of the second embodiment.

For example, the game device 10 sets a designated object as the object in the selected state from among the objects arranged in the game space, and sets the waiting time period Tx corresponding to the object in the selected state. Then, as shown in FIG. 20, the game device 10 performs the predetermined operation (for example, an attack on an enemy character) of the object in the selected state at the timing Tb when finishing the waiting time period Tx which starts from the specific timing Ta (for example, predetermined input start timing). In particular, the game device 10 can reproduce the difficulty of lifting the object with the weight of the object, by setting the waiting time period until the predetermined operation is performed based on the weight of the object in the selected state.

4.4. Description of the Predetermined Range

In the second embodiment, the predetermined range AR is set. Although the predetermined range AR described above has been mainly described for an example of a spherical area based on the position of the player character PC, in the first embodiment and the second embodiment, the predetermined range AR (for example, the field of view) set the sight direction of the virtual camera may be used. The position (viewpoint) of the virtual camera may be a third-person perspective that follows the rear of the player character PC or a first-person perspective of the player character PC.

In the first embodiment, the example has been described in which the predetermined range AR is identified and displayed by visualizing it. However, in the first embodiment and the second embodiment, the game device 10 may control invisibilizing (not to identify and display) the predetermined range AR.

In the second embodiment, the game device 10 may change (enlarge or reduce) the size of the predetermined range AR based on the position of the player character PC.

In the second embodiment, the game device 10 may change the size of the predetermined range AR based on predetermined parameters of the player character PC.

4.5. Object in the Selected State

In the first embodiment, the example in which a designated object is set as the object in the holding state from among the objects existing in the game space has been described. However, in the second embodiment, a designated object from among the objects existing in the game space is set as the object in the selected state.

The object in the selected state (an object set in the selected state) is the object for which the predetermined operation is performed.

The game device 10 stores in the storage 170 (the information storage medium 180 or the like) the object (the object ID, the type of object, the number of objects, or the like) in the selected state corresponding to the ID of the player character or the player ID.

4.5.1. Example of Setting the Object in the Selected Status

The game device 10 sets the object designated by a computer (CPU) as the object in the selected state from among the objects existing within the predetermined range AR.

For example, the game device 10 may set one or more predetermined objects from among the objects existing within the predetermined range AR as objects in the selected state.

For example, the game device 10 may set one object closest to the position of the player character PC as the object in the selected state when there is the plurality of objects pre-selectably set from among the objects existing within the predetermined range AR.

For example, the game device 10 may set one object in the front direction of the player character PC as the object in the selected state when there is a plurality of objects pre-selectably set from among the objects existing within the predetermined range AR.

For example, the game device 10 may set the object that is closest to the position of the player character PC and is on the front side of the player character PC as the object in the selected state when there is the plurality of objects pre-selectably set from among objects that exist in a predetermined range AR.

In the second embodiment, when the object set in the selected state is out of the predetermined range AR, the game device 10 releases the selected state of the object (the selected state flag is updated to 0). In the second embodiment, when another object enters the predetermined range AR, the game device 10 sets the object in the selected state (the selected state flag is set to 1).

The display controller 118 may perform image processing (effect processing) so as to shine regarding the object set to be in the selected state (the object having the selected state flag of 1). By controlling in this way, the player can easily recognize which object is in a selected state by viewing the object being shined.

The game device 10 of the second embodiment may, in the first embodiment, set the object from among the objects existing in the game space based on the operation input of the player as the object in the selected state by the same method as for setting the object as the holding state (see item of 3.1.). For example, the game device 10 may set the object designated based on the instruction operation (operation input) of the player as the object in the selected state regardless of the presence or absence of a predetermined range AR.

The game device 10 of the second embodiment may, in the first embodiment, set up the designated object as the object in the selected state from among the objects arranged in the game space by the same method as the control example (see the item of 3.2.) for displaying information regarding the object in the holding state at the predetermined position on the game image, and perform control for displaying information regarding the object in the selected state (type and number of the objects in the selected state) at the predetermined position on the game image.

In the second embodiment, the game device 10 may display the number of objects in the present selected state on the display 190. By controlling in this way, the player can accurately recognize the number of objects in the current selected state even when there are objects in the selected state that are out of view.

4.5.2. Object Information

The object of the second embodiment is the same as that of the first embodiment shown in FIG. 9. The holding flag may be read as the selectable flag. The holding allowable flag may also be read as the selectable flag. For example, for an object set to a selected state, the selected state flag corresponding to the object ID of the object is set to 1. For objects that are not in the selected state, the selected state flag corresponding to the object ID of the object is set to 0. When an object is released from the selected state, the selected state flag corresponding to the object ID of the object is set to 0.

4.5.3. Arrangement of the Objects in the Selected Status

In the second embodiment, the game device 10 controls the object in the selected state to remain in the arrangement position without moving the object.

4.5.4. Example of Decision Processing to Determine Whether or not to Set the Object in the Selected State The game device 10 of the second embodiment may determine whether or not to set the object in the selected state in accordance with at least one of the distance between the player character PC and the object existing within the predetermined range AR, the type of the object (for example, a material), the weight of the object, the attribution of the object, and compatibility of the player character with the object. For example, the game device 10 of the second embodiment may determine whether or not the object is set to the selected state by the same method as in the decision processing example 1 (see the item of 2.3.5.1.), decision processing example 2 (see the item of 2.3.5.2.), decision processing example 3 (see the item of 2.3.5.3.), and decision processing example 4 (see the item of 2.3.5.4.).

The game device 10 of the second embodiment may determine whether or not to select an object based on the type of the player character (character, sex, skill, or the like). For example, the game device 10 may controls for enabling the object to be in the selected state when the player character has the special skill, and for disabling the object to be in the selected state when the player character does not have the special skill.

The game device 10 of the second embodiment may determine whether or not to select an object based on predetermined parameters (for example, level, capability value, etc.) of the player character. For example, when the level of the player character PC is less than 10, the game device 10 may control an object not to be selected, and when the level of the player character PC is 10 or more, the game device 10 may control an object to be selected.

4.5.5. Example of Changing the Number, Attributions, and Type of Objects that can be Set in the Selected State The game device 10 of the second embodiment may change at least one of the numbers, the attribution, and the type of the objects in the selected state that can be set according to the predetermined parameters (for example, a capability value) of the player character PC. For example, by the same manner in which the number, attribution, or type of the objects in the holding state that can be set as the object in the holding state is changed in the first embodiment, the game device 10 of the second embodiment may change at least one of the number, the attribution, and the type of the objects that can be set as the object in the selected state (see the item of 2.3.6).

4.6. Control of the Waiting Time Period

In the second embodiment, the game device 10 controls the waiting time period from the specific timing until a predetermined operation is performed. Then, the game device 10 controls the waiting time period corresponding to the object in the selected state. The "waiting time period" is the period from the specific timing until the predetermined operation is performed, which may be referred to as the predetermined period, or the specific period.

For example, the game device 10 controls the waiting time period of the object based on the weight of the object in the selected state. For example, the game device 10 controls the waiting time period so that the heavier the weight of the object in the selected state increases, the longer the waiting time period increases.

Specifically, when the object in the selected state is less than 1 kg (for example, nail object OB11 having 0.1 kg), the game device 10 sets the waiting time period to 5, corresponding to the object. When the object in the selected state is 1 kg or more and less than 100 kg (for example, an object OB1 of a bicycle), the game device 10 sets the waiting time period to 7 seconds, corresponding to the object. When the object in the selected state is 100 kg or more (for example, 1600 kg of vehicle object OB4), the game device 10 sets the waiting time period to 10 seconds, corresponding to the object.

In the second embodiment, the game device 10 may set a waiting time period based on the predetermined parameter (for example, a capability value or a level) of the player character and the weight of the object in the selected state, corresponding to the object.

For example, when the object in the selected state is the object OB4 of the car, the waiting time period is 10 seconds. However, the game device 10 controls the waiting time period so that the higher the level of the player character PC increases, the longer the length of the waiting time period of the object OB4 of the car increases. For example, when the level of the player character PC is 10 or more and less than 50, the game device 10 sets the waiting time period of the object OB4 of the vehicle to 8 seconds. Further, when the level of the player character PC is 50 or more and less than 80, the game device 10 sets the waiting time period of the object OB4 of the vehicle to 6 seconds. Furthermore, when the level of the player character PC is 80 or more, the game device 10 sets the waiting time period of the object OB4 of the vehicle to 4 seconds. By controlling in this way, the player can be provided an incentive to increase the level of the player character PC, thereby increasing the amusement of the game play.

The game device 10 of the second embodiment may control the waiting time period corresponding to the object in the selected state based on the type of object in the selected state (for example, a car, a refrigerator, a balloon, a fixture, an adhesive, or the like). For example, the game device 10 may set the waiting time period corresponding to an object type, such as 10 seconds for a waiting time period of an object of a car, 1 second for an object of a balloon, 15 seconds for a fixed object, and 10 seconds for an adhesive object.

When there is the plurality of objects in the selected state, the game device 10 may set a waiting time period for each of a plurality of objects in the selected state based on the type of objects in the selected state.

The game device 10 may set a waiting time period based on the weight of the object in the selected state and the type of object in the selected state. For example, the game device 10 set the waiting time period so that the waiting time period of the fixed road sign object OB 40 has the greater length than the waiting time period of the non-fixed car object OB 4 when the weight of vehicle object OB 4 having 1600 kg and the weight of the road sign object OB 40 having 1600 kg are the same weight. Also, the game device 10 may set the waiting time period so that the waiting time period is changed between when the nail object is simply arranged and when the nail object is fixed by striking onto the wall. In other words, the game device 10 sets the waiting time period so that the waiting time period of the nail object struck into the wall is longer than the waiting time period of the nail object simply arranged.

The game device 10 may set the waiting time period according to the object in the selected state based on the predetermined parameter of the player character and the type of object in the selected state. For example, the game device 10 may determine the waiting time period based on the type of object in the selected state, and further control the waiting time period so that the higher the predetermined parameters (e.g., levels) of the player character increases, the shorter the predetermined parameters (e.g., levels) of the player character is.

4.7. Predetermined Gauge

Figure 21:
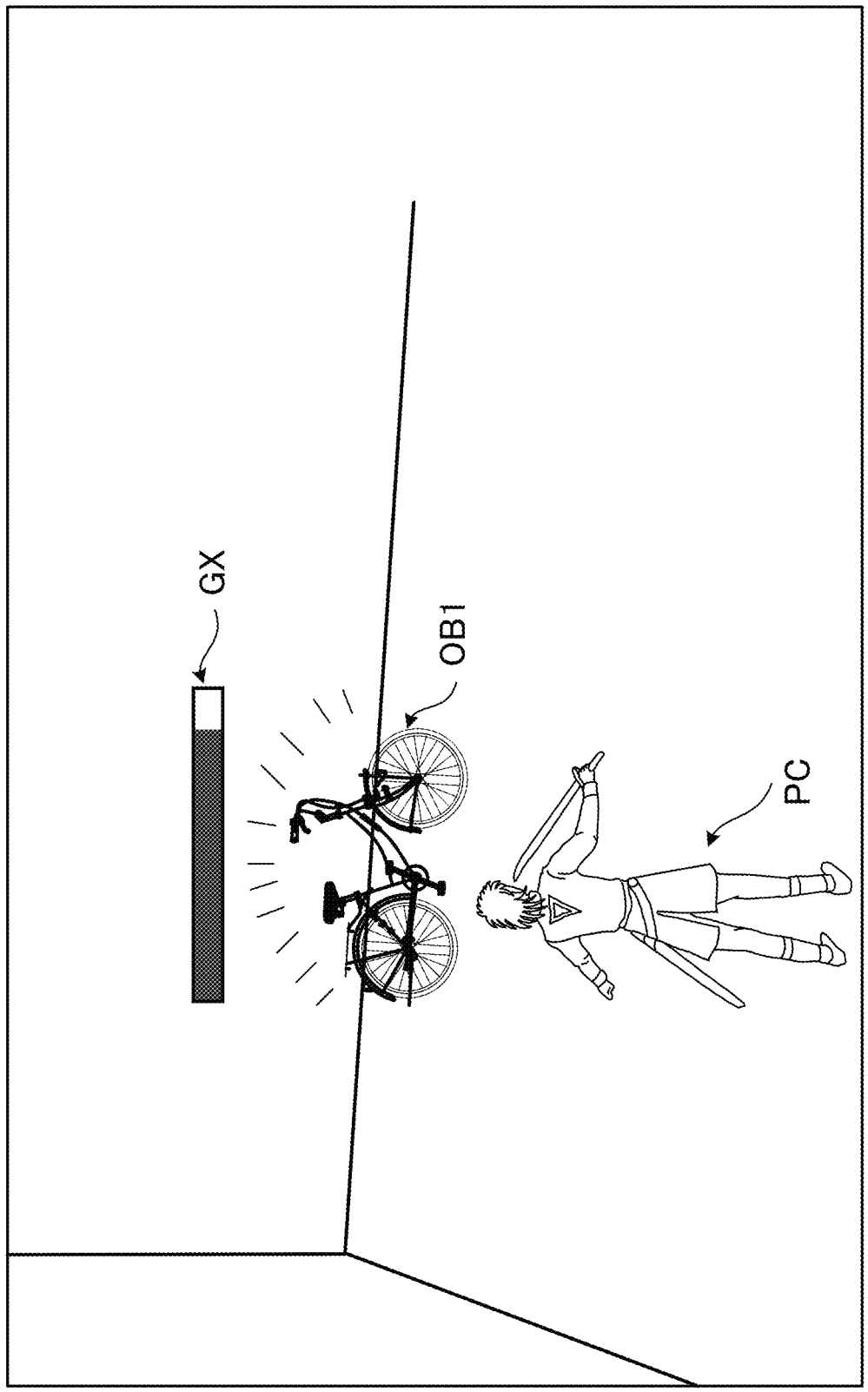
FIG. 21 is a diagram showing an example of the game image of the second embodiment.

As shown in FIG. 21, the display controller 118 of the game device 10 displays a predetermined gauge GX (also referred to as a weight gauge) indicating the elapsed time, which starts from the specific timing Ta, at the top of the object in the selected state or by overlaying on the object in the selected state.

In other words, when a predetermined input is continuously performed, the game device 10 controls for displaying the elapsed time so that an elapsed state in which the predetermined input is continuously detected is displayed by the predetermined gauge GX, a clock hand or the like. For example, as shown in FIG. 21, when the object OB1 of the bicycle is set as the object in the selected state, the game device 10 sets the predetermined timing when starting the predetermined input as the specific timing T, and decreases the predetermined gauge GX according to the passage of time while the predetermined input, which starts from the specific timing Ta, continues. The initial length of the predetermined gauge GX indicates the length of the waiting time period (7 seconds for the bicycle object OB1). In other words, the game device 10 controls for displaying the predetermined gauge GX so that the timing when the predetermined gauge GX becomes 0 is the timing (termination timing) when the waiting time period expires. The game device 10 performs the predetermined operation of the object OB1 of the bicycle in the selected state at timing when the predetermined gauge GX becomes 0.

The game device 10 sets the predetermined input start timing to the specific timing Ta, and controls the predetermined gauge GX for returning the predetermined length to the initial length when the predetermined input is not detected before the waiting time period Tx, which starts from the specific timing Ta, expires. In other words, the game device 10 controls the selected bicycle object OB1 not for performing the predetermined operation when the player stops (cancels) the predetermined input before the waiting time period expires.

The game device 10 of the second embodiment decreases the predetermined gauge GX according to the period for continuously performing the predetermined input. However, the game device 10 may increase the predetermined gauge GX according to the period for continuously performing the predetermined input. In this case, the game device 10 performs the predetermined operation of the predetermined object using the timing when the predetermined gauge GX becomes the maximum value as the expired timing of the waiting time period.

The game device 10 of the second embodiment may provide a plurality of predetermined gauge GX having a different initial fixed length according to the weight of the object in the selected state, the type of object in the selected state, or the length of the waiting time period of the object in the selected state.

Figure 22:
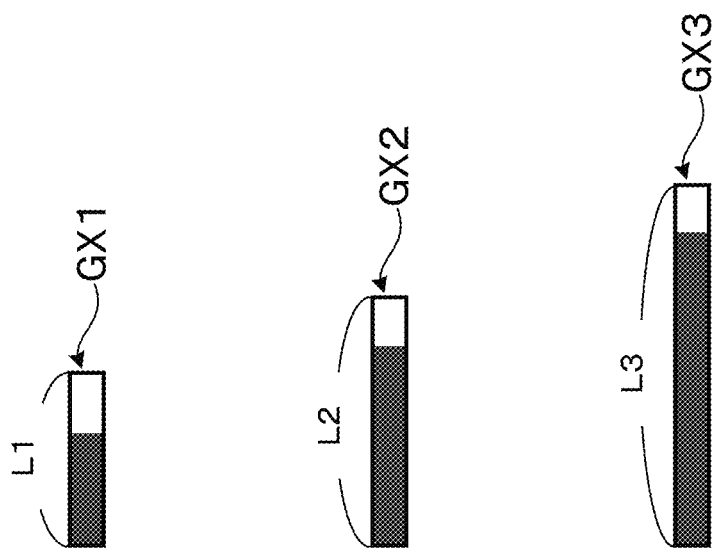
FIG. 22 is an explanatory diagram illustrating a predetermined gauge of the second embodiment.

Specifically, as shown in FIG. 22, the game device 10 sets the waiting time period of 5 seconds for the object in the selected state of less than 1 kg. In this case, the game device 10 provides the predetermined gauge GX1 having an initial length of L1.

The game device 10 sets the waiting time period of 7 seconds for object in the selected state of 1 kg or more and less than 100 kg. In this case, the game device 10 provides the predetermined gauge GX2 having an initial length of L2 (L1<L2).

The game device 10 sets the waiting time period of 10 seconds for the object in the selected state of 100 kg or more. In this case, the game device 10 provides the predetermined gauge GX3 having an initial length of L3 (L1<L2<L3).

The game device 10 of the second embodiment sets the speed at which the predetermined gauge GX is reduced to a predetermined speed V over time from the specific timing Ta regarding the predetermined input, regardless of the length of the predetermined gauge GX. Thus, the shorter the predetermined gauge GX (the lighter the object), the faster the predetermined operation is performed. In other words, the longer the predetermined gauge GX (the heavier the object), the more time it takes for the predetermined operation to be performed.

The game device 10 of the second embodiment may set the initial length of the predetermined gauge GX to be a fixed length, regardless of the weight of the object in the selected state and the length of the waiting time period. Further, the game device 10 may adjust the rate of decrease of the predetermined gauge GX so that the timing when the predetermined gauge GX becomes 0 becomes the timing when the waiting time period expires.

Figure 23:
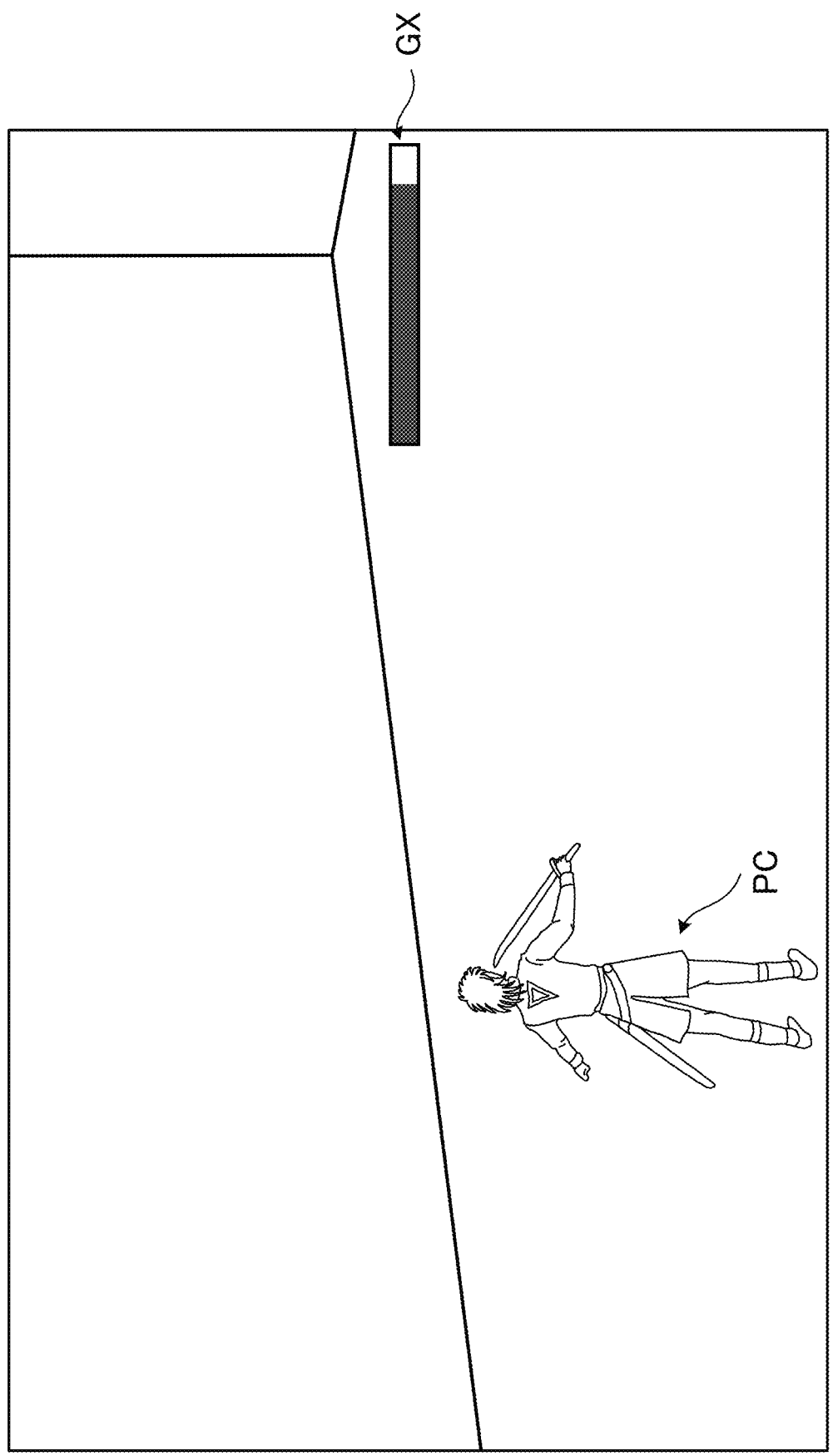
FIG. 23 is a diagram showing an example of the game image of the second embodiment.

The game device 10 of the second embodiment displays the predetermined gauge GX during the predetermined period of input as shown in FIG. 21. However, even when the bicycle object OB1 in the selected state is not displayed by out of the view of the virtual camera, as shown in FIG. 23, the predetermined gauge GX of the bicycle object OB1 in the selected state is displayed at the end (right end) of the screen. By controlling in this way, the player can recognize that the selected bicycle object OB1 with the predetermined input is in the predetermined gauge GX direction (the right direction of the player character PC).

The game device 10 of the second embodiment may remain the object in the selected state during the predetermined period of input, perform an operation of trembling at the predetermined position by preventing the object in the selected state from moving from the placement position, or float from the ground of the placement position and suspend in air. For example, when performing the operation of the object in the selected state during the period of the predetermined input, the game device 10 may change the operation based on the weight or type of the object in the selected state. For example, the game device 10 may remain the object that is lighter than the predetermined value, by floating the object that is heavier than the predetermined value during the predetermined input period.

When the predetermined input is not detected before the waiting time period Tx, which starts from the predetermined input, expires, the game device 10 controls for displaying the object in the selected state, by remaining the object in the selected state in the original placement position, so that it can be seen that the predetermined input is stopped (canceled)

4.8. Operation Control

In the first embodiment, when the predetermined condition is satisfied (for example, when the operation instruction is received from the player or when the operation instruction is given by the CPU (computer)), the holding state of the object in the holding state is released, and the operation of the object is performed. In the second embodiment, the timing for performing the predetermined operation of the object in the selected state is controlled as follows. In other words, the game device 10 of the second embodiment performs a predetermined operation of the object in the selected state when the waiting time period Tx, which starts from the specific timing Ta and which corresponds to the object in the selected state, expires.

For example, the game device 10 performs the operation of the attack so that the nail object OB11 having 0.1 kg is set to be a selected state and the nail object OB11 is fired toward the enemy character at the timing when the waiting time period (e.g., 5 seconds) of the nail object OB11, which starts from the specific timing Ta, expires. The specific timing Ta in the second embodiment is, for example, the start timing of the predetermined input (for example, the input of the psychic powers' attack). Specifically, the specific timing is a button input start timing when a player performs a predetermined button input, and contact start timing to the predetermined input area on a touch panel when a player performs an input to the touch panel.

The game device 10 performs the predetermined operation on the object in the selected state at the timing Tb when the predetermined input continues, the elapsed time of the predetermined input is measured, and the elapsed time of the predetermined input exceeds the waiting time period Tx. For example, when nail object OB 11 having the 0.1 kg is set to be in the selected state, the game device 10 performs the operation of the attack of the nail object OB 11 so that the nail object OB 11 is fired toward the enemy character at timing when the elapsed time, which starts from the predetermined input start timing of the player, exceeds the waiting time period (e.g., 5 seconds).

The specific timing Ta may be specific timing designated by the CPU or the timing when the object in the selected state is set to be in the selected state.

As described in the first embodiment, in the second embodiment, a plurality of predetermined inputs (inputs of the psychic powers' attack) may be prepared. For example, the plurality of predetermined inputs includes the inputs of a triangle button corresponding to a motion indication E1, inputs of a circle button corresponding to a motion indication E2, and inputs of a square button corresponding to a motion indication E3. A plurality of predetermined inputs when operating on the touch panel includes touch inputs on a first region of the touch panel corresponding to the operation instruction E1, touch inputs on a second region of the touch panel corresponding to the operation instruction E2, and touch inputs on a third region of the touch panel corresponding to the operation instruction E3.

The game device 10 of the second embodiment performs the operation of the object in the selected state according to each operation instruction. For example, the game device 10 performs the operation of the near range attack on the object in the selected state in accordance with the operation instruction E1 and performs the operation of the defense of the object in the selected state in accordance with the operation instruction E4.

In addition, in the second embodiment, the game device 10 controls the object in the selected state so that the greater the weight of the object in the selected state (parameters such as offensive power, defensive force, and resilient force) is, the higher the power is.

The game device 10 of the second embodiment may perform the operation based on the preset operation contents of the special object.

The game device 10 of the second embodiment, when the plurality of objects in the selected state exist, sets a waiting time period for each of the plurality of the objects in the selected state based on the weight and type of the objects in the selected state. The game device 10 performs predetermined operations on the object in the selected state for each of a plurality of objects in the selected state at a time when the waiting time period for the object in the selected state has elapsed from the specific timing. By controlling in this way, for example, the game device 10 can attack the enemy character first with the light object and attack the enemy character with the last heavy object. The game device 10 of the second embodiment may change the operation of the object in accordance with predetermined parameters (for example, a capacity value) of the player character.

The game device 10 of the second embodiment may perform the predetermined operation of the object in the selected state on the condition that a given consumption value is subtracted from the operating parameter.

The game device 10 of to the second embodiment may perform predetermined operations (twice or more) for the predetermined number of times for the object in the selected state. For example, the game device 10 may perform the predetermined operation of the object in the selected state, and continuously perform the next predetermined operation. The game device 10 may perform the predetermined operation of the object in the selected state again at timing when the waiting time period, which starts from the specific timing after performing the predetermined operation, associated with the object in the selected state expires.

4.9. Multi-Stage Operation

The game device 10 of the second embodiment may execute the first predetermined operation of the object in the selected state at timing during a waiting time period which starts from the specific timing, and the second predetermined operation of the object in the selected state at the time when the waiting time period expires.

For example, the game device 10 sets the road sign object OB 40 to be in the selected state, and the game device 10 sets the waiting time period of the road sign object OB 40 to 10 seconds. The game device 10 sets the predetermined input start timing to the specific timing Ta, and performs the folding operation of the road sign object OB 40 at the timing Tc at which the predetermined input continues to be detected from the specific timing Ta and at which 7 seconds is elapsed. The game device 10 performs the operation of attacking a part of the road sign object OB 40 (a sign part) against the enemy character at the timing Tb at which a waiting time period Tx (10 seconds), which starts from the specific timing Ta, expires after the predetermined input is continuously detected. By controlling in this way, the game device 10 can improve the interest of the game since there is a plurality of steps until the player character operates without touching the road sign object OB 40.

4.10. Display Control

In the second embodiment, the game device 10 may display information on the weight and type of the object in the selected state on the image. For example, the game device 10 specifically displays the weight of the object as a numerical value for the object in the selected state, and displays the type of objects such as a car, a balloon, and a nail, and properties such as fixtures and adhesives. The player can recognize whether or not the object can be lifted by viewing the information.

As described above, the game device 10 may prepare a plurality of gauges GX1, GX2, and GX3 having different lengths in advance, determine a gauge according to the weight of the object set in the selected state, and display the gauge.

4.11. Flow Chart

Figure 24:
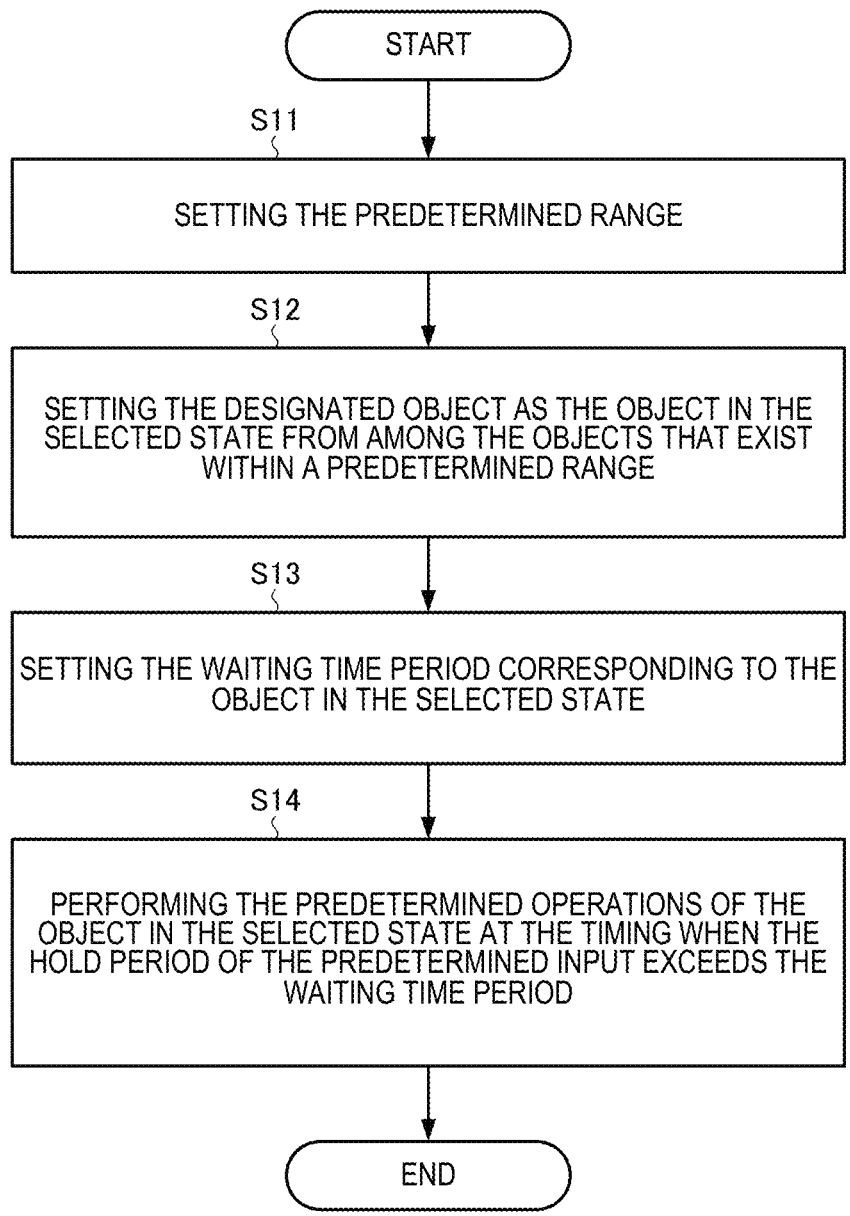
FIG. 24 is a flowchart illustrating a processing flow of the second embodiment.

Next, an example of a processing flow executed by the game device 10 of the second embodiment will be described with reference to FIG. 24.

First, in Step S11, the game device 10 performs processing for setting a predetermined range. In Step S12, the game device 10 sets the object in the selected state as the object in the selected state from among the objects existing within a predetermined range. Then, in Step S13, the game device 10 sets the waiting time period corresponding to the object in the selected state.

Then, in Step S14, the game device 10 performs predetermined operations of the object in the selected state at the timing when the predetermined hold period of the input expires. For example, the game device 10 sets the predetermined input start timing to the specific timing Ta, and performs the predetermined operation of the object in the selected state at the timing Tb when the waiting time period, which starts from the specific timing Ta, expires during the period in which the predetermined input continues. The process is performed in this way.

4.12. Example of Application of Server 20

The server 20 may perform some or all of processing performed by the game device 10 of the second embodiment. For example, the processor 200 of the server 20 may function as receiver 210, arrangement processor 211, movement/motion processor 212, operation controller 212a, game processor 214, range setting processor 216, display controller 218, image generator 208, sound controller 209, selector 231, and period controller 232.

Since the specific processing of the operation controller 212a of the server 20 is the same as that of the operation controller 112a of the game device 10, the description thereof will not be repeated.

The specific processing of the selector 231 of the server 20 is similar to that of the selector 131 of the game device 10, and the description thereof will not be repeated.

Since the specific processing of the period controller 232 of the server 20 is the same as that of the period controller 132 of the game device 10, the description thereof will not be repeated.

4.13. Example of Browser Game Application

The game device 10 of the second embodiment may execute the game program in the browser as in the first embodiment (see the item of 3.11.2.).

5. Other

The present invention is not limited to those described in the above-described embodiments, and various modifications and variations can be made. For example, words cited as broadly or synonymously in the description or drawings may be replaced by broadly or synonymously in the description or drawings.

In embodiments of the present invention, the game is not limited to an action RPG. For example, it can be used in match-up games, such as action games, match-up battle games and sports games, role-playing games (RPGs), and other simulation games. The present invention includes an arrangement substantially identical to the one described in the embodiments (for example, an arrangement with identical functions, methods, and results, or an arrangement with identical purposes and effects).

The invention also includes a non-essential portion of the configuration described in the embodiments. The present invention also includes configurations having the same effect as or capable of achieving the same purpose as the configurations described in the embodiments. The present invention also includes a structure described in the embodiments and a structure in which known techniques are added.

Although the embodiments of the present invention have been described in detail as described above, it will be readily apparent to those skilled in the art that many variations are possible without departing materially from the new matter and effect of the present invention. Accordingly, all such modifications are intended to be within the scope of the present invention.

What is claimed is:

1. A non-transitory computer-readable information storage medium that stores a program for executing a game in which a player character plays against an opponent character using an object from among a plurality of objects disposed in a game space, the program causing a game system to function as:
   a selector that sets the object as a designated object in a selected state from among the plurality of objects disposed in the game space,
   a period controller that controls a waiting time period from a specific timing to an execution of a predetermined operation with respect to the designated object in the selected state;
   a display controller that displays a predetermined gauge that indicates the waiting time period and a time elapsed from the specific timing; and an operation controller that performs the predetermined operation with respect to the designated object in the selected state when the waiting time period has elapsed from the specific timing, wherein the period controller controls the waiting time period based on (i) a capability value or a level of the player character, and (ii) at least one of a virtual weight of the designated object in the selected state and a type of the designated object in the selected state.

2. The non-transitory computer-readable information storage medium according to claim 1, wherein the specific timing is a start of timing of a predetermined input, and the operation controller performs the predetermined operation with respect to the designated object in the selected state when an elapsed time in which the predetermined input is continuously detected from the specific timing exceeds the waiting time period.

3. The non-transitory computer-readable information storage medium according to claim 1, wherein the period controller increases the waiting time period to be longer as the virtual weight of the designated object in the selected state increases.

4. The non-transitory computer-readable information storage medium according to claim 1, wherein the selector sets the designated object, based on an operation input of a player controlling the player character, from among the objects disposed in the game space.

5. The non-transitory computer-readable information storage medium according to claim 1, the program further causing the game system to function as a range setter that sets a predetermined range in the game space based on the position of the player character in the game space, wherein the selector sets the designated object from among the objects that exist within the predetermined range.

6. The non-transitory computer-readable information storage medium according to claim 5, wherein the range setter changes a size of the predetermined range based on the position of the player character.

7. The non-transitory computer-readable information storage medium according to claim 5, wherein the range setter changes the size of the predetermined range based on a predetermined parameter of the player character.

8. The non-transitory computer-readable information storage medium according to claim 1, wherein the selector sets the designated object and at least one additional object to the selected state.

9. The non-transitory computer-readable information storage medium according to claim 1, wherein the selector controls display of a number of objects in the selected state.

10. The non-transitory computer-readable information storage medium according to claim 1, wherein the selector sets a plurality of designated objects from among the plurality of objects, the designated objects being in the selected state, the period controller sets the waiting time period for each of the plurality of designated objects in the selected state based on at least one of a virtual weight of each object in the selected state and the type of each object in the selected state, and the operation controller performs the predetermined operation with respect to each object in the selected state when a predetermined input is detected after the waiting time period is elapsed from the specific timing.

11. The non-transitory computer-readable information storage medium according to claim 1, wherein the selector determines whether or not to set the object in the selected state according to at least one of a distance between the player character and the object in the game space, the type of the object, an attribution of the object, and a compatibility between the player character and the object in the game.

12. The non-transitory computer-readable information storage medium according to claim 1, wherein the selector changes at least one of a number, an attribution, and the type of each of the plurality of objects that can be set in the selected state according to a predetermined parameter of the player character.

13. The non-transitory computer-readable information storage medium according to claim 1, wherein the operation controller changes the operation of the designated object according to a predetermined parameter of the player character.

14. The non-transitory computer-readable information storage medium according to claim 1, wherein the operation controller performs the predetermined operation with respect to the designated object in the selected state on condition that a given consumption value is subtracted from an operating parameter.

15. A game device in which a player character plays against an opponent character using an object from among a plurality of objects disposed in a game space, the game device comprising:

a selector that sets the object as a designated object in a selected state from among the plurality of objects disposed in the game space;

a period controller that controls a waiting time period from a specific timing to an execution of a predetermined operation with respect to the designated object in the selected state;

a display controller that displays a predetermined gauge that indicates the waiting time period and a time elapsed from the specific timing; and an operation controller that performs the predetermined operation with respect to the designated object in the selected state when the waiting time period has elapsed from the specific timing, wherein the period controller controls the waiting time period based on (i) a capability value or a level of the player character, and (ii) at least one of a virtual weight of the designated object in the selected state and a type of the designated object in the selected state.

16. A server configured to execute a game in which a player character plays against an opponent character using an object from among a plurality of objects disposed in a game space, the server comprising:

a selector that sets the object as a designated object in a selected state from among the plurality of objects disposed in the game space, a period controller that controls a waiting time period from a specific timing to an execution of a predetermined operation with respect to the designated object in the selected state;

a display controller that displays a predetermined gauge that indicates the waiting time period and a time elapsed from the specific timing; and an operation controller that performs the predetermined operation with respect to the designated object in the selected state when the waiting time period has elapsed from the specific timing, wherein the period controller controls the waiting time period based on (i) a capability value or a level of the player character, and (ii) at least one of a virtual weight of the designated object in the selected state and a type of the designated object in the selected state.

17. The non-transitory computer-readable information storage medium according to claim 1, wherein the predetermined gauge is a rectangular box, and the display continually changes an appearance of the rectangular box as the time elapsed from the specific timing increases.

18. A non-transitory computer-readable information storage medium that stores a program for executing a game in which a player character plays against an opponent character using multiple objects from among a plurality of objects disposed in a game space, the program causing a game system to function as:

a selector that sets the multiple objects as designated objects in a selected state from among the plurality of objects disposed in the game space;

an arrangement section that arranges the designated objects in an upper part of the game space;

a period controller that controls a waiting time period from a specific timing to an execution of a predetermined operation with respect to one of the designated objects in the selected state; and an operation controller that performs the predetermined operation with respect to the one of the designated objects in the selected state when the waiting time period has elapsed from the specific timing, wherein the period controller controls the waiting time period based on (i) a capability value or a level of the player character, and (ii) at least one of a virtual weight of the one of the designated objects in the selected state and a type of the one of the designated objects in the selected state.

19. A game device in which a player character plays against an opponent character using multiple objects from among a plurality of objects disposed in a game space, the game device comprising:

a selector that sets the multiple objects as designated objects in a selected state from among the plurality of objects disposed in the game space;

an arrangement section that arranges the designated objects in an upper part of the game space;

a period controller that controls a waiting time period from a specific timing to an execution of a predetermined operation with respect to one of the designated objects in the selected state; and an operation controller that performs the predetermined operation with respect to the one of the designated objects in the selected state when the waiting time period has elapsed from the specific timing, wherein the period controller controls the waiting time period based on (i) a capability value or a level of the player character, and (ii) at least one of a virtual weight of the one of the designated objects in the selected state and a type of the one of the designated objects in the selected state.

20. A server configured to execute a game in which a player character plays against an opponent character using multiple objects from among a plurality of objects disposed in a game space, the server comprising:

a selector that sets the multiple objects as designated objects in a selected state from among the plurality of objects disposed in the game space;

an arrangement section that arranges the designated objects in an upper part of the game space;

a period controller that controls a waiting time period from a specific timing to an execution of a predetermined operation with respect to one of the designated objects in the selected state; and an operation controller that performs the predetermined operation with respect to the one of the designated objects in the selected state when the waiting time period has elapsed from the specific timing, wherein the period controller controls the waiting time period based on (i) a capability value or a level of the player character, and (ii) at least one of a virtual weight of the one of the designated objects in the selected state and a type of the one of the designated objects in the selected state.

* * * * *